United States Patent
Maruyama et al.

(10) Patent No.: US 10,630,924 B2
(45) Date of Patent: Apr. 21, 2020

(54) IMAGE PROCESSING APPARATUS, IMAGE PROCESSING METHOD, AND NON-TRANSITORY COMPUTER READABLE RECORDING MEDIUM

(71) Applicant: OLYMPUS CORPORATION, Tokyo (JP)

(72) Inventors: Hiroki Maruyama, Hino (JP); Manabu Ichikawa, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/260,196

(22) Filed: Jan. 29, 2019

(65) Prior Publication Data

US 2019/0174081 A1    Jun. 6, 2019

Related U.S. Application Data

(63) Continuation of application No. PCT/JP2016/072640, filed on Aug. 2, 2016.

(51) Int. Cl.
*H04N 5/365* (2011.01)
*H04N 5/232* (2006.01)
(Continued)

(52) U.S. Cl.
CPC ............ *H04N 5/365* (2013.01); *G06T 5/002* (2013.01); *H04N 5/23229* (2013.01);
(Continued)

(58) Field of Classification Search
CPC .... H04N 5/23229; H04N 5/357; H04N 5/365; H04N 9/7908; G06T 5/002
See application file for complete search history.

(56) References Cited

U.S. PATENT DOCUMENTS

| 2003/0169352 A1 | 9/2003 | Kitani |
| 2009/0244331 A1 | 10/2009 | Suzuki et al. |
| 2015/0092074 A1 | 4/2015 | Ikeda |

FOREIGN PATENT DOCUMENTS

| JP | 2003-333435 A | 11/2003 |
| JP | 2011-059911 A | 3/2011 |

(Continued)

OTHER PUBLICATIONS

International Search Report dated Oct. 11, 2016 issued in International Application No. PCT/JP2016/072640.

*Primary Examiner* — Daniel M Pasiewicz
(74) *Attorney, Agent, or Firm* — Scully, Scott, Murphy & Presser, P.C.

(57) ABSTRACT

An image processing apparatus executes plural corrections for plural types of noises having mutually different characteristics included in image data generated by an image sensor including plural pixels, and including plural read-out circuits that read out the signal of each pixel as a pixel value. The apparatus includes a noise correction unit executable of the plural types of correction processes in an order determined based on the characteristic of each of the plural types of noises and a signal generating process from a light reception through an output of pixel values from the pixel. The noise correction unit classifies the plural types of correction processes into plural groups, on the basis of the characteristic of each of the plural types of noises, and executes the plural types of correction processes in an order determined in accordance with the plural groups and the signal generation process.

12 Claims, 20 Drawing Sheets

(51) Int. Cl.
*H04N 5/367* (2011.01)
*H04N 5/357* (2011.01)
*G06T 5/00* (2006.01)
*H04N 5/77* (2006.01)
*H04N 9/79* (2006.01)
*H04N 9/73* (2006.01)

(52) U.S. Cl.
CPC ............. *H04N 5/357* (2013.01); *H04N 5/367* (2013.01); *H04N 5/77* (2013.01); *H04N 5/772* (2013.01); *H04N 9/7908* (2013.01); *H04N 9/735* (2013.01)

(56) References Cited

FOREIGN PATENT DOCUMENTS

| | | |
|---|---|---|
| JP | 5425343 B2 | 2/2014 |
| JP | 2015-072583 A | 4/2015 |
| WO | 2006/043563 A1 | 4/2006 |
| WO | 2013/001868 A1 | 1/2013 |

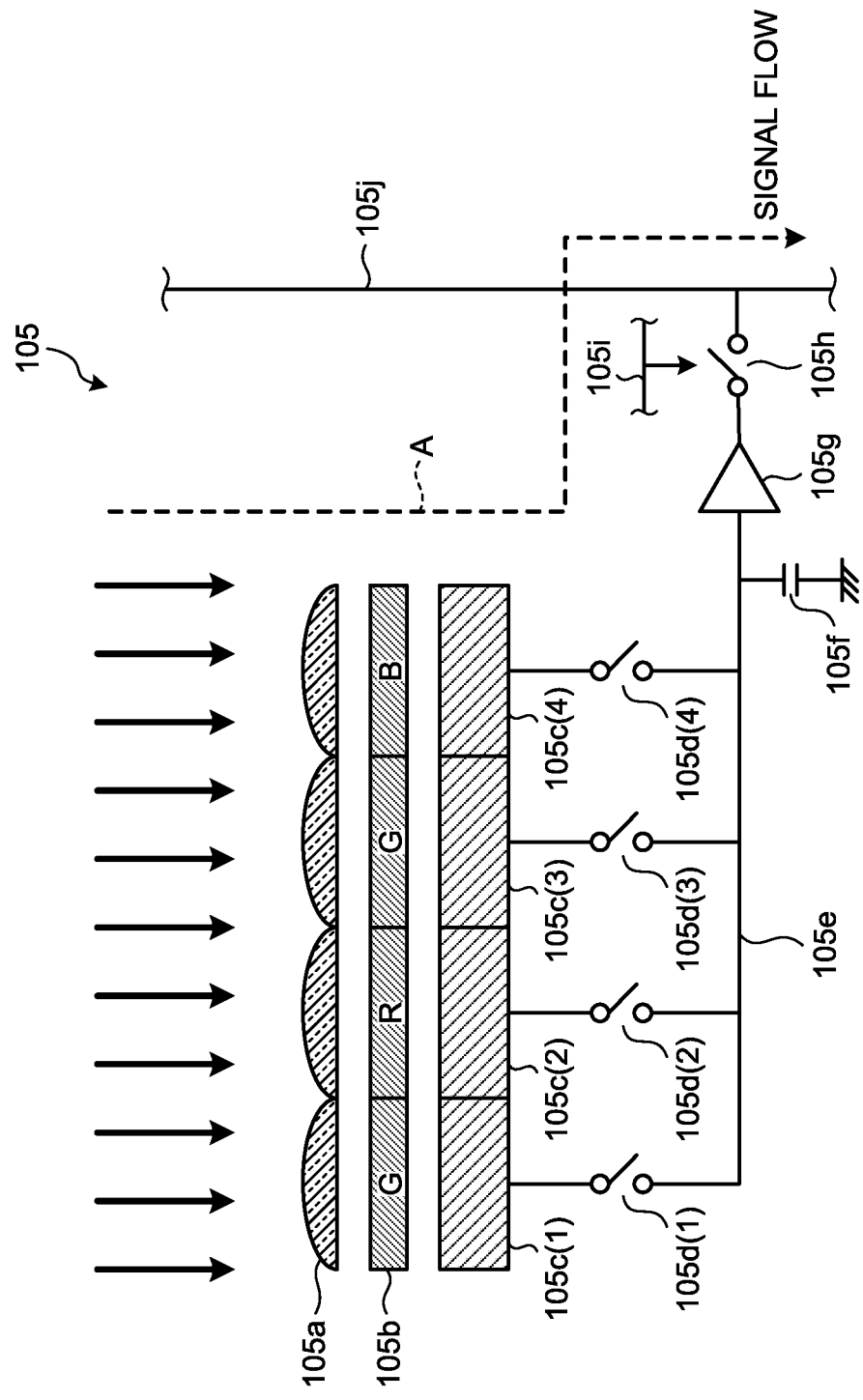

FIG.3

| No. | NOISE TYPE | CORRECTION PROCESSING TYPE | OCCUR-RENCE LOCATION | NOISE LEVEL | OCCUR-RENCE RANGE | DETECTION AT COR-RECTION | CORRECTION ON/OFF SWITCHING |
|---|---|---|---|---|---|---|---|
| NOISE 1 | FD WHITE BLEMISH | FD WHITE SPOT CORRECTION PROCESSING | FD | LOW | MIDDLE | PRESENT | NO |
| NOISE 2 | WHITE BLEMISH | WHITE SPOT CORRECTION PROCESSING | PD | HIGH | SMALL | PRESENT | NO |
| NOISE 3 | RTS NOISE | RTS NOISE CORRECTION PROCESSING | SF | LOW | MIDDLE | ABSENT | NO |
| NOISE 4 | SPECTRAL SENSITIVITY VARIATION | SPECTRAL SENSITIVITY VARIATION CORRECTION PROCESSING | OCF | LOW | LARGE | ABSENT | NO |
| NOISE 5 | LOW SATURATION PIXEL | LOW SATURATION PIXEL CORRECTION PROCESSING | PD | MIDDLE | SMALL | ABSENT | YES |

T1

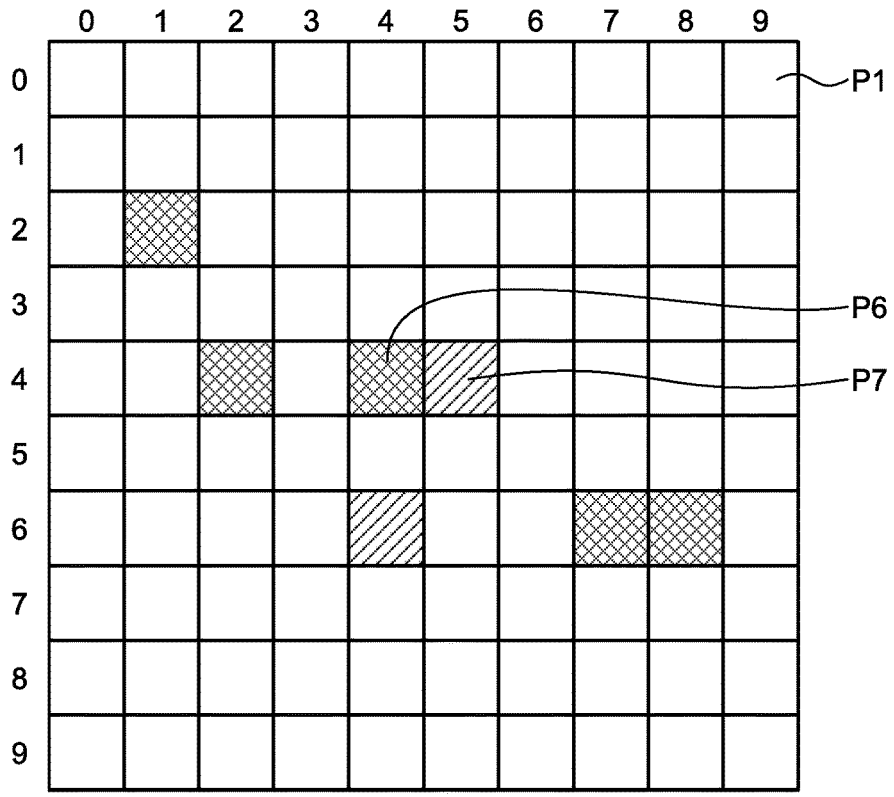

| | |
|---|---|
| 0 | 3950 |
| 1 | (5,4)=3000 |
| 2 | (4,6)=2500 |
| 3 | |
| 4 | |
| 5 | |
| 6 | |
| 7 | |
| 8 | |
| 9 | |

FIG.18A

GROUP 1 RANGE: SMALL
- WHITE SPOT CORRECTION PROCESSING
- LOW SATURATION PIXEL CORRECTION PROCESSING

GROUP 2 RANGE: MIDDLE
- RTS NOISE CORRECTION PROCESSING
- FD WHITE SPOT CORRECTION PROCESSING

GROUP 3 RANGE: LARGE
- SPECTRAL SENSITIVITY VARIATION CORRECTION PROCESSING

FIG.18B

| ORDER | |
|---|---|
| 1 | WHITE SPOT CORRECTION PROCESSING |
| 1 | LOW SATURATION PIXEL CORRECTION PROCESSING |
| 3 | RTS NOISE CORRECTION PROCESSING |
| 4 | FD WHITE SPOT CORRECTION PROCESSING |
| 5 | SPECTRAL SENSITIVITY VARIATION CORRECTION PROCESSING |

FIG.18C

| ORDER | |
|---|---|
| 1 | WHITE SPOT CORRECTION PROCESSING |
| 2 | LOW SATURATION PIXEL CORRECTION PROCESSING |
| 3 | RTS NOISE CORRECTION PROCESSING |
| 4 | FD WHITE SPOT CORRECTION PROCESSING |
| 5 | SPECTRAL SENSITIVITY VARIATION CORRECTION PROCESSING |

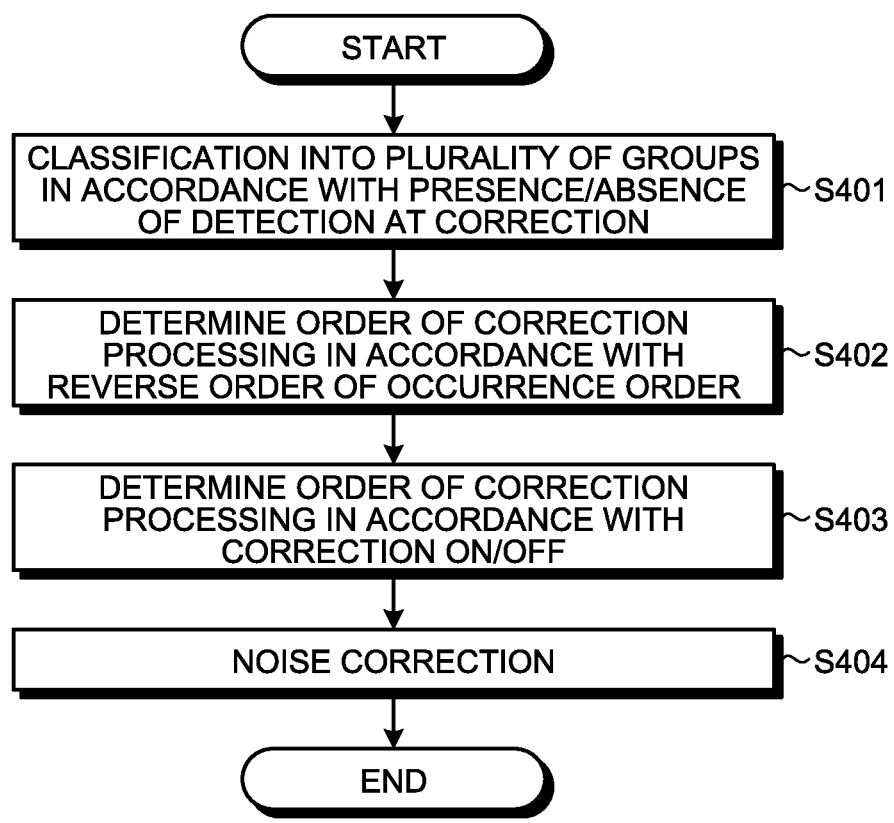

IMAGE PROCESSING APPARATUS, IMAGE PROCESSING METHOD, AND NON-TRANSITORY COMPUTER READABLE RECORDING MEDIUM

CROSS-REFERENCE TO RELATED APPLICATION

This application is a continuation of International Application No. PCT/JP2016/072640, filed on Aug. 2, 2016, the entire contents of which are incorporated herein by reference.

BACKGROUND

The present disclosure relates to an image processing apparatus, an image processing method, and a non-transitory computer readable recording medium.

A technique has been known which corrects color contamination or random noise that occurs depending on use conditions of an image sensor onto image data generated by an image sensor used in an imaging apparatus (refer to JP 5425343 B2). This technique performs color contamination correction process of correcting color contamination and random noise correction process of reducing random noise in an optimum processing order to prevent degradation of image quality.

SUMMARY

The present disclosure is directed to an improvement of an image processing apparatus and an image processing method.

According to a first aspect of the present disclosure, there is provided an image processing apparatus executable of a plurality of types of correction processes of correcting each of a plurality of types of noises having mutually different characteristics included in image data generated by an image sensor including a plurality of pixels that receive light and generate a signal according to an amount of received light and including a plurality of read-out circuits that read out the signal of each of the pixels as a pixel value, the image processing apparatus comprising a noise correction unit executable of the plurality of types of correction processes in an order determined in accordance with the characteristic of each of the plurality of types of noises and a signal generating process from a reception of light by the pixels through an output of pixel values from the pixel, wherein the noise correction unit classifies the plurality of types of correction processes into a plurality of groups, on the basis of the characteristic of each of the plurality of types of noises, and executes the plurality of types of correction processes in an order determined in accordance with the plurality of groups and the signal generating process.

According to a second aspect of the present disclosure, there is provided an image processing method to be executed by an image processing apparatus executable of a plurality of types of correction processes of correcting each of a plurality of types of noises having mutually different characteristics included in image data generated by an image sensor including a plurality of pixels that receive light and generate a signal according to an amount of received light and including a plurality of read-out circuits that read out the signal of each of the pixels as a pixel value, the image processing method comprising executing the plurality of types of correction processes in an order determined in accordance with the characteristic of each of the plurality of types of noises and a signal generating process from a reception of light by the pixels through an output of pixel values from the pixel, wherein the noise correction unit classifies the plurality of types of correction processes into a plurality of groups, on the basis of the characteristic of each of the plurality of types of noises, and executes the plurality of types of correction processes in an order determined in accordance with the plurality of groups and the signal generating process.

According to a third aspect of the present disclosure, there is provided a non-transitory computer readable medium storing a program that causes an image processing apparatus executable of a plurality of types of correction processes of correcting each of a plurality of types of noises having mutually different characteristics included in image data generated by an image sensor including a plurality of pixels that receive light and generate a signal according to an amount of received light and including a plurality of read-out circuits that read out the signal of each of the pixels as a pixel value, to execute processing, the processing comprising executing the plurality of types of correction processes in an order determined in accordance with the characteristic of each of the plurality of types of noise and a signal generating process from a reception of light by the pixels through an output of pixel values from the pixel, wherein the noise correction unit classifies the plurality of types of correction processes into a plurality of groups, on the basis of the characteristic of each of the plurality of types of noises, and executes the plurality of types of correction processes in an order determined in accordance with the plurality of groups and the signal generating process.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 2 is a diagram schematically illustrating a configuration of main portions of an image sensor according to the first embodiment of the present disclosure;

FIG. 3 is a diagram illustrating an exemplary characteristic of each of types of noise that occurs in an image sensor according to the first embodiment of the present disclosure;

FIG. 8 is a diagram schematically illustrating an example of a defective pixel and a low saturation pixel in the image sensor according to the first embodiment of the present disclosure;

FIG. 9 is a diagram schematically illustrating an example of low saturation pixel information included in noise information recorded by a noise information recording unit according to the first embodiment of the present disclosure;

FIG. 18A is a diagram schematically illustrating a method of determining an order of a plurality of types of correction processes by a noise correction unit according to the second embodiment of the present disclosure;

FIG. 18B is a diagram schematically illustrating a method of determining an order of a plurality of types of correction processes by the noise correction unit according to the second embodiment of the present disclosure;

FIG. 18C is a diagram schematically illustrating a method of determining an order of a plurality of types of correction processes by the noise correction unit according to the second embodiment of the present disclosure;

FIG. 20 is a flowchart illustrating an outline of noise processing executed by an image processing apparatus according to a third embodiment of the present disclosure;

DETAILED DESCRIPTION OF THE PREFERRED EMBODIMENTS

Figure 1:
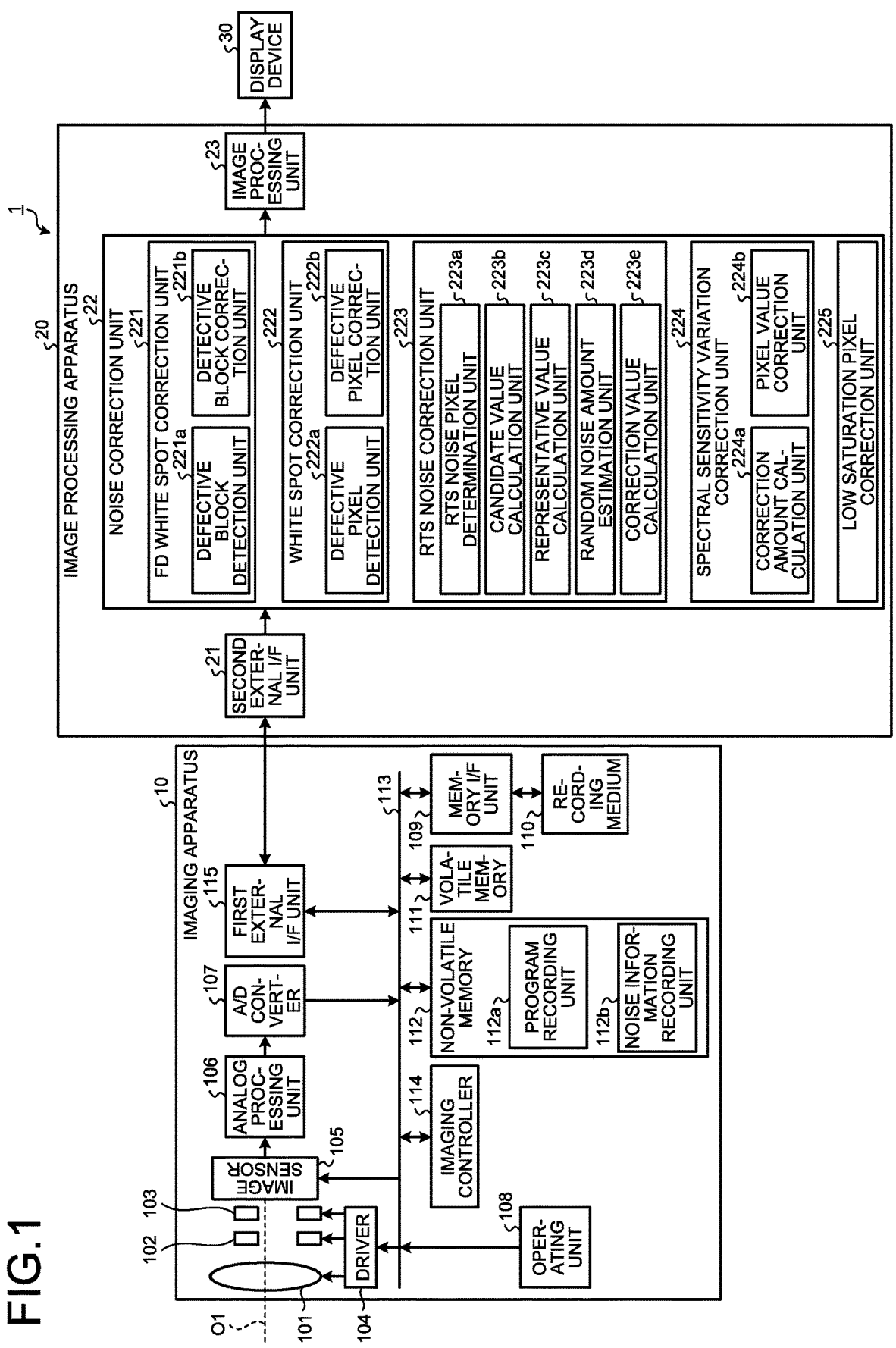
FIG. 1 is a block diagram schematically illustrating a configuration of an imaging system according to a first embodiment of the present disclosure.

Hereinafter, embodiments of the present disclosure (hereinafter, referred to as embodiment(s)) will be described with reference to the drawings. Note that the present disclosure is not limited by the following embodiments. In the description of the drawings, the same portions are given the same reference numerals.

First Embodiment

Configuration of Imaging System

FIG. 1 is a block diagram schematically illustrating a configuration of an imaging system according to a first embodiment of the present disclosure. An imaging system 1 illustrated in FIG. 1 includes an imaging apparatus 10, an image processing apparatus 20, and a display device 30.

Configuration of Imaging Apparatus

First, a configuration of the imaging apparatus 10 will be described. As illustrated in FIG. 1, the imaging apparatus 10 includes an optical system 101, a diaphragm 102, a shutter 103, a driver 104, an image sensor 105, an analog processing unit 106, an analog-to-digital (A/D) converter 107, an operating unit 108, a memory interface (I/F) unit 109, a recording medium 110, a volatile memory 111, a non-volatile memory 112, a bus 113, an imaging controller 114, and a first external I/F unit 115.

The optical system 101 includes a plurality of lenses. The optical system 101 includes a focus lens and a zoom lens, for example.

The diaphragm 102 adjusts exposure by limiting an incident amount of light collected by the optical system 101. Under the control of the imaging controller 114, the diaphragm 102 limits the incident amount of the light collected by the optical system 101.

The shutter 103 sets the state of the image sensor 105 to an exposure state or a light-shielding state. The shutter 103 includes a focal plane shutter, for example.

Under the control of the imaging controller 114 described below, the driver 104 drives the optical system 101, the diaphragm 102, and the shutter 103. For example, the driver 104 moves the optical system 101 along an optical axis O1 to perform zoom magnification change or focusing position adjustment for the imaging apparatus 10.

Under the control of the imaging controller 114 described below, the image sensor 105 receives the light collected by the optical system 101, converts the received light into image data (electrical signal), and outputs the image data. The image sensor 105 includes a complementary metal oxide semiconductor (CMOS) including a plurality of twodimensionally arranged pixels. An RGB filter arranged in a Bayer array is disposed on a front surface of each of the pixels. Note that the image sensor 105 is not limited to the Bayer array but may be in a stacked form such as Fovion's, for example. Moreover, not only RGB filter but also any other filter such as a complementary color filter may be employed. Alternatively, a light source may be used which is capable of emitting light beams of different colors on a time division basis without disposing a filter on the image sensor 105, and to form a color image using sequentially captured images while changing the colors of the beams to be emitted.

Now, a configuration of the image sensor 105 will be described in detail. FIG. 2 is a diagram schematically illustrating a configuration of main portions of the image sensor 105. Note that the image sensor 105 in FIG. 2 is an exemplary case where a read-out circuit is shared by a plurality of pixels in order to enhance sensitivity by increasing the aperture ratio of the pixel. In the following, the image sensor 105 is assumed to include one read-out circuit arranged for eight pixels, that is, two pixels in the horizontal direction (lateral direction)×four pixels in the vertical direction (longitudinal direction). It is also assumed that the pixels and read-out circuits described above are arranged in the horizontal direction and the vertical direction on the image sensor 105. Furthermore, it is assumed that a plurality of pixels (shared blocks) sharing a read-out circuit is arranged in the image sensor 105.

As illustrated in FIG. 2, the image sensor 105 includes: a microlens 105a that condenses light; a color filter 105b constituted with a plurality of filters having different spectral transmittances arranged in a predetermined array pattern; a plurality of pixels 105c (photodiodes: PDs) that receives light transmitted through the microlens 105a and the color filter 105b and performs photoelectric conversion, thereby generating electrical charges in accordance with an exposure amount; a first switch 105d provided on each of the plurality of pixels 105c and opens or closes in accordance with the control of the imaging controller 114; a transfer line 105e that transfers signals (electrical charges) output from each of the plurality of pixels 105c; a floating diffusion (FD) unit 105f that stores the signals output from the plurality of pixels 105c; an amplifier unit 105g that amplifies the signals output from the FD unit 105f; a second switch 105h that opens or closes in accordance with the control of the imaging controller 114; a control line 105i that controls the second switch 105h; and a transfer line 105j that transfers the electrical signal amplified by the amplifier unit 105g. In addition, the color filter 105b is formed in accordance with a Bayer array using two G filters that transmit light in the green wavelength band, an R filter that transmits light in the red wavelength band, and a B filter that transmits light in the blue wavelength band.

When the above-configured image sensor 105 reads out a signal that corresponds to the exposure amount in the pixel 105c as a pixel value as illustrated by an arrow A, an electrical charge generated in the pixel 105c(1) is transferred to the FD unit 105f by first resetting the FD unit 105f and by turning on solely a first switch 105d(1) by the imaging controller 114. Thereafter, the imaging controller 114 turns on the second switch 105h, whereby the image sensor 105 causes the amplifier unit 105g to amplify the electrical charges stored in the FD unit 105f and reads out (outputs) the electrical charge as a pixel value. Next, the image sensor 105 resets the FD unit 105f, and the imaging controller 114 turns on solely a first switch 105d(2), whereby the image sensor 105 transfers the electrical charges generated on the pixel 105c(2) to the FD unit 105f. Thereafter, the imaging controller 114 turns on the second switch 105h, whereby the image sensor 105 causes the amplifier unit 105g to amplify the electrical charges stored in the FD unit 105f and reads out the electrical charge as a pixel value. By sequentially performing such read-out operation, the image sensor 105 can sequentially output the signal that corresponds to the exposure amount in each of the pixels 105c, as a pixel value. Note that in the first embodiment, the FD unit 105f, the amplifier unit 105g, and the second switch 105h function as a read-out circuit that reads out electrical charges or a pixel value from each of the plurality of pixels 105c.

Returning to FIG. 1, description of the configuration of the imaging apparatus 10 follows below.

The analog processing unit 106 performs predetermined analog processing onto an analog signal input from the image sensor 105 and outputs the processed signal to the A/D converter 107. Specifically, the analog processing unit 106 performs noise reduction processing, gain-up processing, or the like, on the analog signal input from the image sensor 105. For example, the analog processing unit 106 performs, onto the analog signal, reduction of reset noise and so on, and waveform shaping, and then, further performs gain-up processing to achieve intended brightness.

The A/D converter 107 generates digital image data (hereinafter, referred to as "RAW image data") by performing A/D conversion onto the analog signal input from the analog processing unit 106, and outputs the generated data to the volatile memory 111 via the bus 113. Note that the A/D converter 107 may directly output the RAW image data to predetermined parts of the imaging apparatus 10 described below. Note that the analog processing unit 106 and the A/D converter 107 may be provided on the image sensor 105, and the image sensor 105 may directly output digital RAW image data.

The operating unit 108 issues various instructions to each part of the imaging apparatus 10. Specifically, the operating unit 108 includes a power switch that switches the power supply states of the imaging apparatus 10 between an on-state and an off-state, a release switch that issues an instruction of still image shooting, an operation switch that switches various settings of the imaging apparatus 10, and a moving image switch that issues an instruction of moving image shooting.

The recording medium 110 includes a memory card attached from outside of the imaging apparatus 10, and is removably attached onto the imaging apparatus 10 via the memory I/F unit 109. Moreover, the recording medium 110 may output programs and various types of information to the non-volatile memory 112 via the memory I/F unit 109 under the control of the imaging controller 114.

The volatile memory 111 temporarily stores image data input from the A/D converter 107 via the bus 113. For example, the volatile memory 111 temporarily stores image data sequentially output from the image sensor 105 frame by frame, via the analog processing unit 106, the A/D converter 107, and the bus 113. The volatile memory 111 includes a synchronous dynamic random access memory (SDRAM).

The non-volatile memory 112 includes a flash memory or the like. The non-volatile memory 112 records various programs needed to operate the imaging apparatus 10 and various types of data used in execution of the program. Furthermore, the non-volatile memory 112 includes a program recording unit 112a and a noise information recording unit 112b that records noise information related to various types of noise in the image sensor 105. The noise information includes Random Telegraph Signal (RTS) noise information, spectral sensitivity variation information, defective pixel information, and low saturation pixel information.

Here, the RTS noise information includes RTS noise position information of RTS noise, level information, and a random noise model, in the image sensor 105.

The spectral sensitivity variation information includes a correction coefficient for correcting spectral sensitivity variation in each of the plurality of pixels constituting the image sensor 105. Note that only correction coefficients for some of the pixels with large variations may be retained (or may be included) in the RTS noise information. The spectral sensitivity variation signifies noise that is due to an optical system provided on each light receiving surface of a plurality of pixels constituting the image sensor 105 and caused by a manufacturing process. Here, the optical system includes a microlens provided on a light receiving surface of a pixel, various filters (for example, a color filter, an infrared cut filter, a low pass filter, etc.).

The defective pixel information includes position information of a defective pixel corresponding to a position of a pixel in the image sensor 105 (position information includes one or both of position information of a read-out circuit (position information of the amplifier unit 105g) that reads out a pixel value and information of a pixel position at which a defective pixel occurs) and level information. Note that the defective pixel information may include information regarding defective pixels known as an FD white spot and a white spot.

The low saturation pixel information includes position information of a low saturation pixel corresponding to the position of a pixel in the image sensor 105 (position information includes one or both of position information of a read-out circuit (position information of the amplifier unit 105g) that reads out the pixel value and information of a pixel position at which a low saturation pixel occurs) and level information. Note that level information needs not be included in any noise information.

The bus 113 includes a transmission line that connects individual parts of the imaging apparatus 10 with each other, and transfers various types of data generated inside the imaging apparatus 10 to each of the individual parts of the imaging apparatus 10.

The imaging controller 114 includes a central processing unit (CPU), and integrally controls operation of the imaging apparatus 10 by providing instruction and transferring data to individual parts of the imaging apparatus 10 in response to an instruction signal and a release signal from the operating unit 108. For example, when a second release signal has been input from the operating unit 108, the imaging controller 114 performs control of starting shooting operation on the imaging apparatus 10. Herein, the shooting operation on the imaging apparatus 10 is operation of predetermined processing performed by the analog processing unit 106 and the A/D converter 107, onto the image data output by the image sensor 105. The image data processed in this manner are recorded in the recording medium 110 via the bus 113 and the memory I/F unit 109 under the control of the imaging controller 114.

The first external I/F unit 115 outputs information input from external apparatuses via the bus 113, to the non-volatile memory 112 or the volatile memory 111, and together with this, outputs, to external apparatuses via the bus 113, information recorded in the volatile memory 111, information recorded in the non-volatile memory 112, and the image data generated by the image sensor 105. Specifically, the first external I/F unit 115 outputs the image data generated by the image sensor 105 to the image processing apparatus 20 via the bus 113.

Configuration of Image Processing Apparatus

Next, a configuration of the image processing apparatus 20 will be described. The image processing apparatus 20 includes a second external I/F unit 21, a noise correction unit 22, and an image processing unit 23.

The second external I/F unit 21 obtains RAW image data generated by the image sensor 105, via the first external I/F unit 115 of the imaging apparatus 10, and outputs the obtained RAW image data to the noise correction unit 22. In addition, the second external I/F unit 21 obtains noise information recorded by the noise information recording unit 112b of the non-volatile memory 112 via the first external I/F unit 115 of the imaging apparatus 10, and then outputs the obtained noise information to the noise correction unit 22.

The noise correction unit 22 performs noise correction process of correcting noise on the RAW image data input from the second external I/F unit 21, and outputs the corrected RAW image data to the image processing unit 23. Specifically, the noise correction unit 22 executes a plurality of types of correction processes in the order determined in accordance with characteristics of a plurality of types of noise, and with a signal generation process in which light is transmitted through the color filter 105b thereby to be incident onto the pixel 105c, and a pixel value is output from the pixel 105c (refer to an arrow A in FIG. 2). With execution of this processing, the noise correction unit 22 corrects a plurality of types of noise generated in the RAW image data and then outputs the corrected image data to the image processing unit 23. The noise correction unit 22 includes an FD white spot correction unit 221, a white spot correction unit 222, an RTS noise correction unit 223, a spectral sensitivity variation correction unit 224, and a low saturation pixel correction unit 225.

The FD white spot correction unit 221 corrects a FD white spot caused by the defective FD onto the RAW image data obtained by the second external I/F unit 21 and then outputs the corrected data. The FD white spot correction unit 221 includes a defective block detection unit 221a and a defective block correction unit 221b.

On the basis of the RAW image data obtained by the second external I/F unit 21, the defective block detection unit 221a uses a pixel value of a pixel in the shared block including a plurality of pixels sharing the read-out circuit and a pixel value of the pixel outside the shared block so as to detect an offset component of the pixel value generated in the shared block, and then outputs the detection result to the defective block correction unit 221b. More specifically, the defective block detection unit 221a detects the offset component of the pixel value generated in the shared block on the basis of a difference between the pixel value of the pixel in the shared block and the pixel value of the pixel outside the shared block, adjacent to the pixel in the shared block. The defective block detection unit 221a may use the pixel value of the pixel in the shared block and the pixel value of the pixel outside the shared block to detect a position of the shared block (defective block) including a FD white spot on the basis of the RAW image data obtained by the second external I/F unit 21, and may then output the detection result to the defective block correction unit 221b.

The defective block correction unit 221b calculates a correction amount for correcting the pixel value of the pixel in the shared block on the basis of the offset component detected by the defective block detection unit 221a, then uses this correction amount to correct the pixel value of the pixel in the shared block, and output the corrected value.

The white spot correction unit 222 corrects a white spot caused by the defective FD onto the RAW image data obtained by the second external I/F unit 21, and then outputs the corrected data. Specifically, the white spot correction unit 222 executes white spot correction process using the pixel value of peripheral pixels of the white spot onto the RAW image data on the basis of the position information of the white spot included in the noise information recorded by the noise information recording unit 112b, and then outputs the corrected data. The white spot correction unit 222 includes a defective pixel detection unit 222a and a defective pixel correction unit 222b. The white spot correction unit 222 may execute the white spot correction process by using a known technique (refer to, for example, JP 4453332 B2).

The defective pixel detection unit 222a detects a defective pixel in the RAW image data on the basis of noise information recorded by the noise information recording unit 112b, and outputs the result to the defective pixel correction unit 222b. For example, the defective pixel detection unit 222a detects a defective pixel in the RAW image data on the basis of white spot position information included in the noise information recorded by the noise information recording unit 112b, and then outputs the result to the defective pixel correction unit 222b. The defective pixel detection unit 222a may detect a defective pixel by using a known technique.

The defective pixel correction unit 222b corrects the pixel value of the defective pixel detected by the defective pixel detection unit 222a and outputs the corrected value.

The RTS noise correction unit 223 performs RTS noise correction process of correcting RTS noise onto the RAW image data on the basis of the RTS noise information included in the noise information recorded in the noise information recording unit 112b of the non-volatile memory 112 of the imaging apparatus 10, and then outputs the corrected data. The RTS noise correction unit 223 includes an RTS noise pixel determination unit 223a, a candidate value calculation unit 223b, a representative value calculation unit 223c, a random noise amount estimation unit 223d, and a correction value calculation unit 223e. Note that the RTS noise correction unit 223 may execute the RTS noise correction process using a known technique (refer to, for example, JP 2012-105063 A).

The RTS noise pixel determination unit 223a obtains the noise information recorded in the noise information recording unit 112b of the imaging apparatus 10, via the second external I/F unit 21, the first external I/F unit 115, and the bus 113, determines whether RTS noise occurs in the pixel of the RAW image that has been obtained, and outputs a determination result to the candidate value calculation unit 223b and the representative value calculation unit 223c. Specifically, when the pixel position is input into the RTS noise pixel determination unit 223a, the RTS noise pixel determination unit 223a determines whether the RTS information that corresponds to the pixel is recorded in the noise information recording unit 112b of the imaging apparatus 10. When the information is recorded, the RTS noise pixel determination unit 223a outputs the RTS noise information (information indicating that the RTS noise is present). When the information is not recorded on the noise information recording unit 112b of the imaging apparatus 10, the RTS noise pixel determination unit 223a determines the pixel to be a pixel free from occurrence of the RTS noise and does not output the RTS noise information.

When the RTS noise pixel determination unit 223a determines that RTS noise occurs in a pixel of interest, the candidate value calculation unit 223b calculates a plurality of candidate values for a correction amount that corresponds to the pixel value of the pixel of interest, on the basis of the pixel value of the pixel of interest in the RAW image and the determination result from the RTS noise pixel determination unit 223a. Then, the RTS noise pixel determination unit 223a outputs the pixel value of the pixel of interest in the RAW image and the plurality of calculated candidate values, to each of the representative value calculation unit 223c, the random noise amount estimation unit 223d, and the correction value calculation unit 223e.

When the RTS noise pixel determination unit 223a has determined that RTS noise occurs on the pixel of interest, the representative value calculation unit 223c calculates a representative value that corresponds to the pixel value for the case of no occurrence of RTS noise, on the basis of at least the pixel that has been determined to be free from RTS noise by the RTS noise pixel determination unit 223a among the pixels around the pixel of interest, and on the basis of a reference value of the random noise amount that corresponds to the pixel of interest, calculated by the random noise amount estimation unit 223d described below. The representative value calculation unit 223c outputs the pixel value of the pixel of interest in the RAW image, the plurality of candidate values, and the above-calculated representative value, to the correction value calculation unit 223e.

The random noise amount estimation unit 223d estimates the random noise amount that corresponds to the pixel value on the basis of a random noise model included in the noise information recorded in the noise information recording unit 112b of the imaging apparatus 10, and outputs an estimation result to the representative value calculation unit 223c. That is, when a pixel value is input into the random noise amount estimation unit 223d, a random noise amount that corresponds to the pixel value is output.

When the RTS noise pixel determination unit 223a has determined that the pixel of interest is a pixel having a possibility of occurrence of RTS noise, the correction value calculation unit 223e corrects the pixel value of the pixel of interest on the basis of the plurality of candidate values calculated by the candidate value calculation unit 223b. Specifically, on the basis of the pixel value of the pixel of interest in the RAW image, the plurality of candidate values calculated by the candidate value calculation unit 223b, and the representative value calculated by the representative value calculation unit 223c, the correction value calculation unit 223e calculates a pixel value for which the RTS noise has been corrected, and outputs the pixel value. More specifically, the correction value calculation unit 223e corrects the pixel value of the pixel of interest on the basis of the candidate value that causes a correction result to come closest to the representative value calculated by the representative value calculation unit 223c, among the plurality of candidate values calculated by the candidate value calculation unit 223b, and then, outputs the corrected pixel value. In contrast, when the RTS noise pixel determination unit 223a has determined that the pixel of interest is a pixel in which RTS noise does not occur, the correction value calculation unit 223e outputs the pixel value of the pixel of interest in the RAW image, without adding any change to the value.

On the basis of the noise information recorded in the noise information recording unit 112b of the non-volatile memory 112 of the imaging apparatus 10, the spectral sensitivity variation correction unit 224 performs spectral sensitivity variation correction process of correcting spectral sensitivity variation of each of filters onto the RAW image, and then outputs the corrected image. The spectral sensitivity variation correction unit 224 includes a correction amount calculation unit 224a and a pixel value correction unit 224b.

The correction amount calculation unit 224a calculates a correction amount for correcting the pixel value of the pixel of interest on the basis of the correction coefficient of the pixel of interest recorded by the noise information recording unit 112b and the pixel value of neighboring pixels in the pixel of interest, and then outputs the calculated correction amount. The correction amount calculation unit 224a calculates a correction amount for correcting the pixel value of the pixel of interest on the basis of the pixel value of the pixel of interest and neighboring pixels. Here, the neighboring pixels are pixels adjacent to the pixel of interest or pixels located in the vicinity of the pixel of interest. Furthermore, the pixel adjacent to the pixel of interest is a pixel positioned in the left-right and up-down direction with respect to the pixel of interest. Furthermore, the pixel located in the vicinity of the pixel of interest is a pixel positioned in a diagonal direction with respect to the pixel of interest or a pixel closest to the pixel of interest with the same color as the pixel of interest.

The pixel value correction unit 224b corrects the pixel value of the pixel of interest by using the correction amount calculated by the correction amount calculation unit 224a, and then outputs the corrected value.

The low saturation pixel correction unit 225 performs low saturation pixel correction process of correcting low saturation pixels on the basis of noise information recorded in the noise information recording unit 112b, and then outputs the result.

The image processing unit 23 applies predetermined image processing on the image data in which noise has been corrected by the noise correction unit 22, and outputs the processed data to the display device 30. The predetermined image processing herein corresponds to basic image processing including at least optical black subtraction processing, white balance adjustment processing, and including synchronization processing of the image data, color matrix calculation processing, γ correction process, color reproduction processing, edge enhancement processing, and noise reduction processing, when the image sensor is arranged in a Bayer array. Moreover, the image processing unit 23 performs image processing of reproducing a natural image on the basis of individual image processing parameters that have been set beforehand. The parameters of image processing are values of contrast, sharpness, saturation, white balance, and gradation.

Configuration of Display Device

Next, a configuration of the display device 30 will be described. The display device 30 displays an image that corresponds to the image data input from the image processing apparatus 20. The display device 30 includes a display panel of liquid crystal, organic electroluminescence (EL), or the like.

In the imaging system 1 having the above configuration, the image processing apparatus 20 corrects noise in the RAW image data generated by the image sensor 105, and the display device 30 displays an image that corresponds to the image data that has undergone image processing performed by the image processing apparatus 20.

Characteristic of Each of Types of Noise

Next, a characteristic of each of types of noise that occurs in the image sensor 105 will be described. FIG. 3 is a diagram illustrating a list of characteristics of each of types of noise.

As illustrated in FIG. 3, Table T1 lists noise types and noise characteristics in association with each other. Specifically, Table T1 lists five types of noise, namely, FD white spot, white spot, RTS noise, spectral sensitivity variation, and low saturation pixel. In addition, Table T1 lists information related to each of types of noise, such as an occurrence location, a noise level, an occurrence range, the presence/absence of detection at the time of correction, and correction on/off switching by which correction details are switched depending on a specific condition, being associated with each of types of noise.

Here, the occurrence location is a location where noise is generated in the image sensor 105. The noise level is a magnitude of a deviation of a pixel value from the normal value, caused by the noise. The occurrence range is a magnitude of a pixel range affected by noise in the event of noise (minimum unit). The presence/absence of detection at the time of correction is information describing either of information indicating that correction is performed while detecting a noise generation pixel at the time of correction (with detection) and information indicating that correction is to be performed with no detection of a noise generation pixel at the time of correction (with no detection). The correction on/off switching is information indicating whether to switch the correction details depending on a specific condition. While the five types of noise are exemplified referring to FIG. 3, noise other than the five types, for example, one resulting from a black spot or the like may be included. Furthermore, the characteristic in Table T1 in FIG. 3 is an example and may be changed in accordance with the characteristics of the image sensor 105.

Example of Occurrence of Noise

Next, an example of occurrence of each of types of noise will be described. Hereinafter, examples of noise generation will be described in the order illustrated in Table T1 in FIG. 3.

FD White Spot

Figure 4:
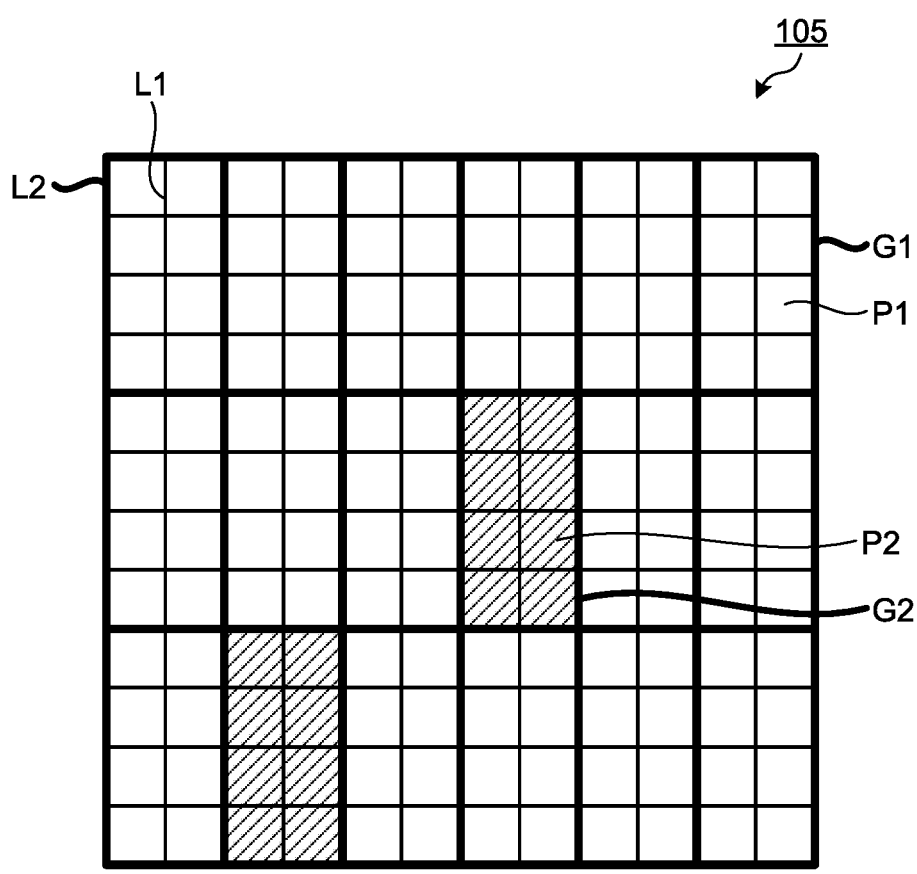
FIG. 4 is a diagram schematically illustrating an occurrence example of a floating diffusion (FD) white spot caused by a read-out circuit in the image sensor according to the first embodiment of the present disclosure.

First, an example of occurrence of FD white spot caused by a defective FD in the image sensor 105 will be described. FIG. 4 is a diagram schematically illustrating an example of occurrence of the FD white spot due to the defective FD in the image sensor 105. FIG. 4 illustrates a case, similarly to the above-described FIG. 2, of a shared block in which signals are read out by one read-out circuit for eight pixels, that is, two pixels in the horizontal direction×four pixels in the vertical direction. Furthermore, in FIG. 4, a square formed by a thin line L1 and a thick line L2 represents a pixel, and an open square indicates a normal pixel P1. Furthermore, in FIG. 4, a frame G1 formed only by the thick line L2 represents a shared block that outputs a normal value, while a group G2 having eight shaded pixels P2 represents a FD white spot (defective block) in which noise occurs due to the defective FD which is a part of the read-out circuit.

As illustrated in FIG. 4, in a read-out circuit including a defective FD, the FD white spot indicates an abnormal shared block or a pixel in which the pixel value of each of pixels read out through the read-out circuit is uniformly higher or uniformly lower than neighboring pixel values. Therefore, a value obtained by adding a certain offset amount to the normal value is output as a pixel value of the pixel P2 in which FD white spot is occurring. Note that when the pixels are in a same shared block, the offset amount is equal.

White Spot

Figure 5:
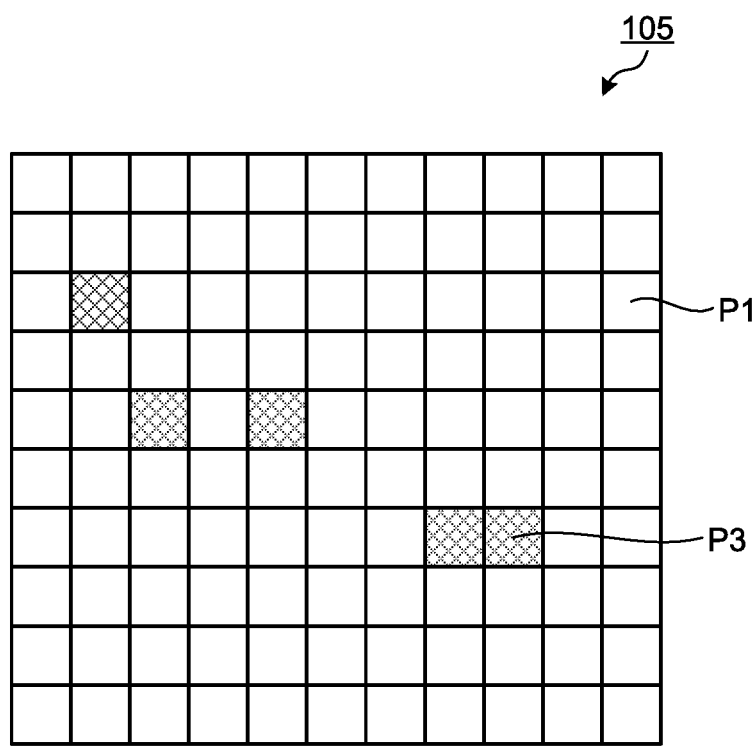
FIG. 5 is a diagram schematically illustrating an occurrence example of white spot in the image sensor according to the first embodiment of the present disclosure.

Next, an example of occurrence of a white spot that occurs in the image sensor 105 will be described. FIG. 5 is a diagram schematically illustrating an occurrence example of a white spot in the image sensor 105. In FIG. 5, hatched pixels P3 indicate defective pixels, namely, either white spots or black spots.

As illustrated in FIG. 5, a white spot (pixel P3) is a phenomenon having a higher pixel value compared with the pixel value of the normal pixel P1 by a certain level. That level varies with exposure time, temperature, and gain. Meanwhile, the black spot is a phenomenon having a lower pixel value compared with the pixel value of the normal pixel P1 by a certain level, contrary to the white spot.

RTS Noise

Figure 6:
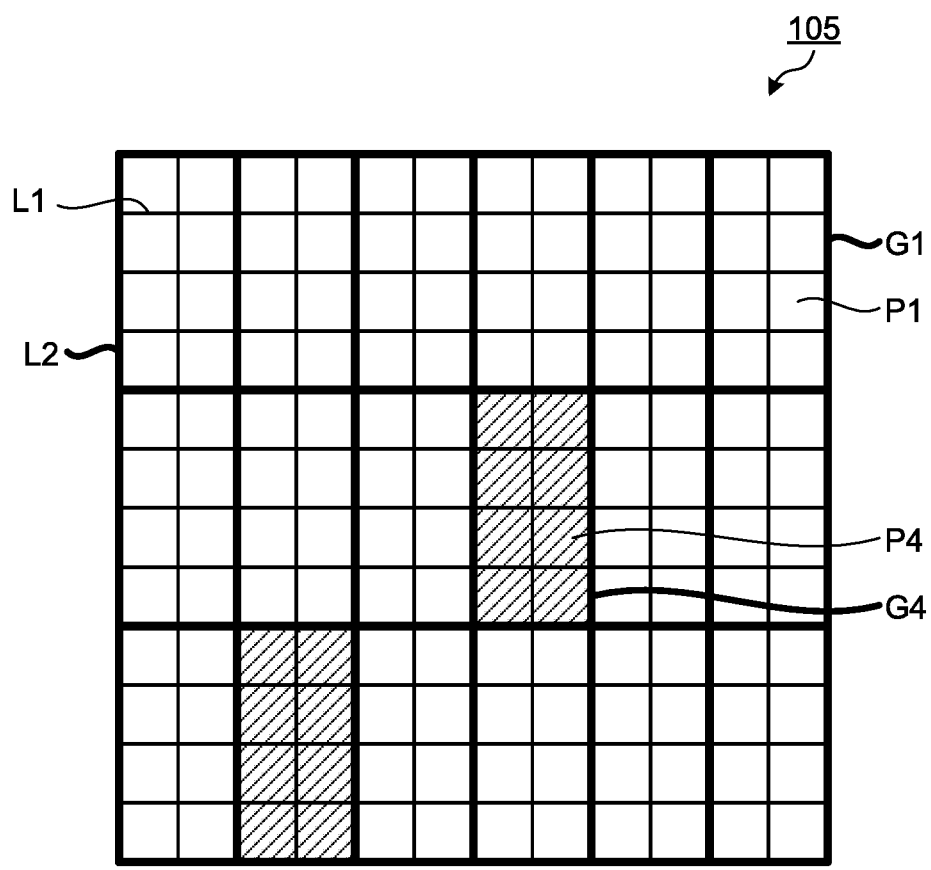
FIG. 6 is a diagram schematically illustrating an occurrence example of RTS noise in the image sensor according to the first embodiment of the present disclosure.

Next, an example of occurrence of RTS noise that occurs in the image sensor 105 will be described. FIG. 6 is a diagram schematically illustrating an example of occurrence of RTS noise in the image sensor 105. FIG. 6 illustrates a case, similarly to the above-described FIG. 2, of a shared block in which signals are read out by one read-out circuit for eight pixels, that is, two pixels in the horizontal direction×four pixels in the vertical direction. Furthermore, in FIG. 6, a square formed by a thin line L1 and a thick line L2 represents a pixel, and an open square indicates a normal pixel P1. Furthermore, in FIG. 6, the frame G1 formed by the thick line L2 indicates a shared block that outputs a normal value, while a group G4 having eight shaded pixels P4 represents a defective block.

As illustrated in FIG. 6, a pixel P4 at which the RTS noise occurs blinks at random intervals. Note that when the pixels are in a same shared block, the maximum offset amount is equal.

Spectral Sensitivity Variation

Figure 7:
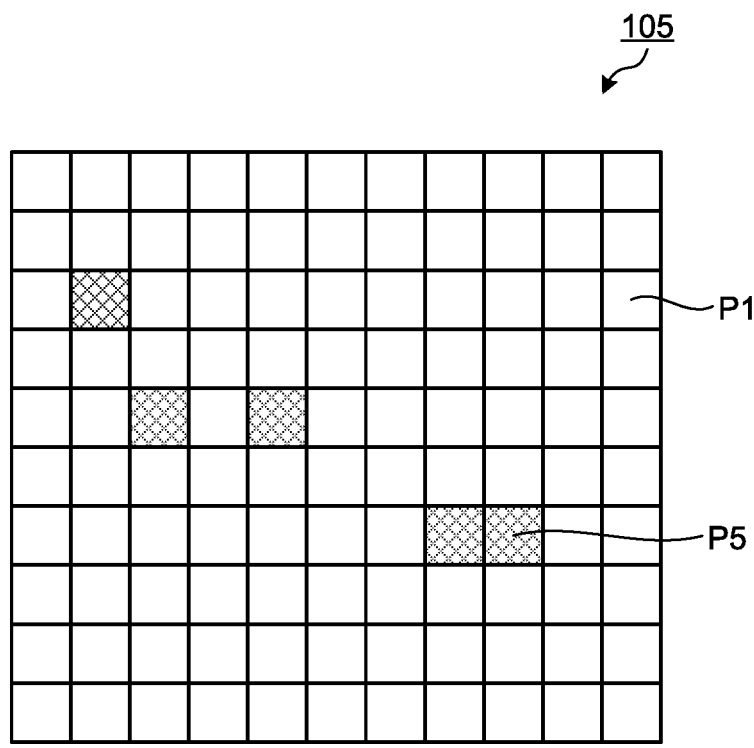
FIG. 7 is a diagram schematically illustrating an occurrence example of spectral sensitivity variation in the image sensor according to the first embodiment of the present disclosure.

Next, an example of occurrence of spectral sensitivity variations that occurs in the image sensor 105 will be described. FIG. 7 is a diagram schematically illustrating an example of occurrence of spectral sensitivity variation in the image sensor 105. In FIG. 7, pixels P5 (black spots and bright spots) with poor sensitivity are indicated by hatching. Note that even the normal pixel P1 includes minute spectral sensitivity variation.

As illustrated in FIG. 7, the pixel P5 indicates a phenomenon having sensitivity to light being remarkably high or remarkably low in comparison with the normal pixel P1. For this reason, the spectral sensitivity variation occurs specifically in a pixel having a large difference from the sensitivity of the normal pixel P1. Since a poor sensitivity pixel is a phenomenon indicating a difference in sensitivity similarly to the spectral sensitivity variation, the poor sensitivity defective pixel may be corrected by the spectral sensitivity variation correction process.

Low Saturation Pixel

Next, an example of occurrence of a low saturation pixel that occurs in the image sensor 105 will be described. FIG. 8 is a diagram schematically illustrating an occurrence example of a defective pixel and a low saturation pixel in the image sensor. In FIG. 8, a pixel P6 (cross-hatched) indicates a defective pixel such as a white spot or a black spot, and a pixel P7 (hatched) indicates a low saturation pixel.

The pixel P7 illustrated in FIG. 8 outputs a pixel value below a maximum value even when imaging is performed onto a flat bright subject with no contrast, while an output value of a normal pixel P1 reaches the maximum value (4095 for 12 bits, for example) when such imaging is performed.

Figures 10, 11:
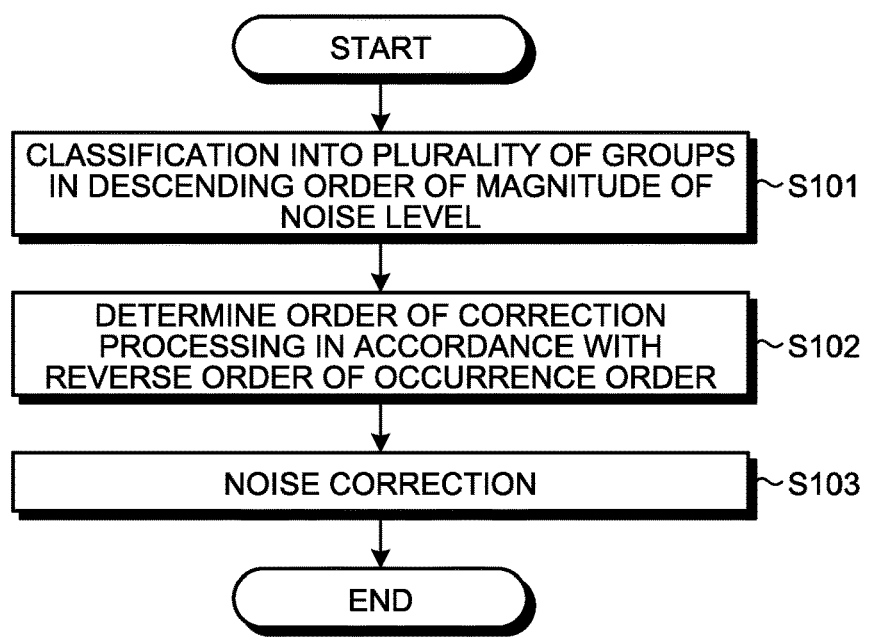
FIG. 10 is a diagram schematically illustrating an example of low saturation pixel information included in noise information recorded by a noise information recording unit according to the first embodiment of the present disclosure.
FIG. 11 is a flowchart illustrating an outline of noise processing executed by an image processing apparatus according to the first embodiment of the present disclosure.

FIG. 9 is a diagram schematically illustrating an example of the low saturation pixel information included in noise information recorded by the noise information recording unit 112b. FIG. 10 is a diagram schematically illustrating an example of the low saturation pixel information included in noise information. In FIG. 9, pixels P10 and P11 represent low saturation pixels.

As illustrated in FIGS. 8 to 10, the low saturation pixel information includes position information for each of pixels and a saturation level detected beforehand by a detection device or the like in association with each other. As a recording method, there are a method (refer to FIG. 9) of obtaining a saturation level map in which a saturation level is set for each of a plurality of pixels in RAW image data generated by the image sensor 105, and a method (refer to FIG. 10) of obtaining coordinates (address) and the saturation level of the low saturation pixel, in association with each other. When implementing the method of obtaining the coordinates (address) of the low saturation pixel in association with the saturation level, a coordinate and a corresponding saturation level are recorded in association with each other for the low saturation pixel and only the saturation level is recorded for a pixel other than the low saturation pixel. When the coordinates in association with the saturation level are recorded, the corresponding saturation level is going to be used. When the coordinates are not recorded, the saturation level of pixels other than the low saturation pixel is going to be used. However, regarding a pixel that is not a low saturation pixel, when it is sufficiently saturated, a maximum value of the pixel value (for example, 4095 in the case of 12 bits) may be set as the saturation level.

Incidentally, in FIGS. 9 and 10, the saturation level is recorded to correspond to the position of the pixel. However, when the saturation level is lowered due to the read-out circuit, the saturation level may be recorded to correspond to the position of the read-out circuit (of course, the saturation level may be recorded by the method illustrated in FIGS. 9 and 10). In this case, after reading out the recorded information, the information converted to the saturation level per pixel may be set as the low saturation pixel information, such as setting the same saturation level to the pixels sharing the read-out circuit.

Furthermore, the saturation level of each of pixels may desirably be determined in consideration of the linearity of the pixel value and random noise, or the like. For example, a value obtained by reducing a value based on the random noise amount of the luminance from the pixel value of an image obtained by exposure under a condition achieving complete saturation may be set as the saturation level of the pixel. Alternatively, the pixel value at which the linearity is lost may be set as the saturation level. The saturation level may of course be set in consideration of both.

Processing in Image Processing Apparatus

Figure 12A:
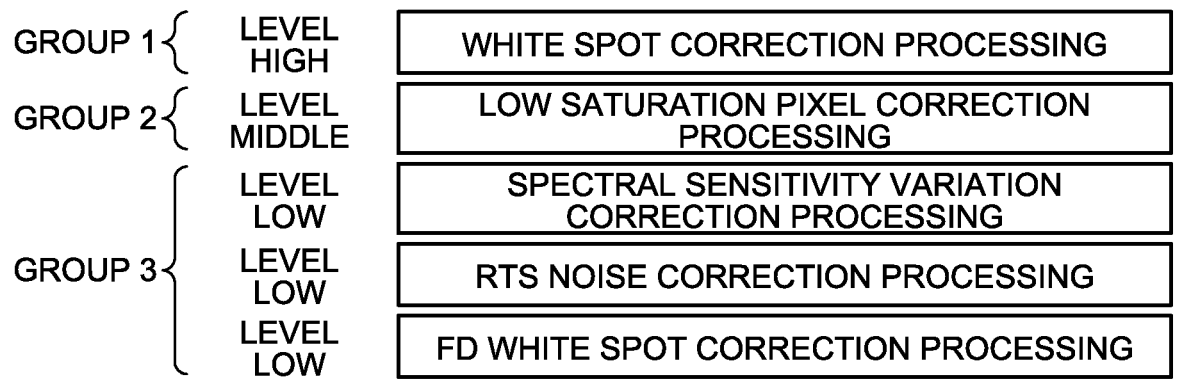
FIG. 12A is a diagram schematically illustrating a method of determining an order of a plurality of types of correction processes by a noise correction unit according to the first embodiment of the present disclosure.
Figure 12B:
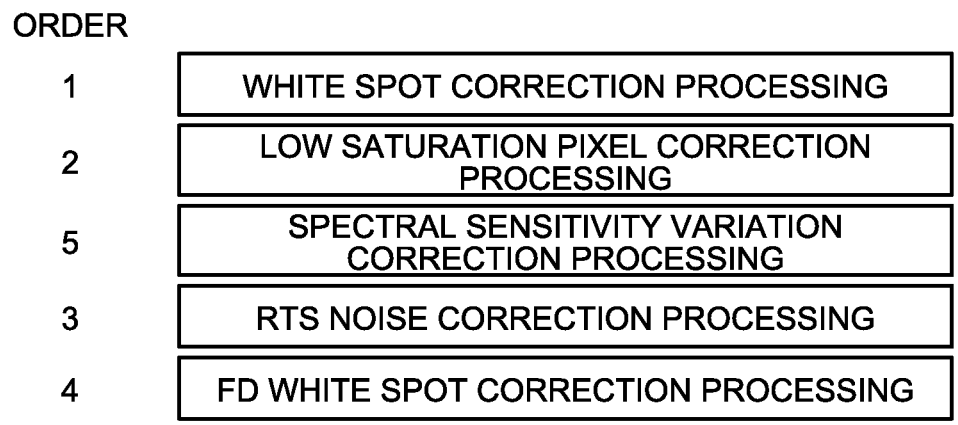
FIG. 12B is a diagram schematically illustrating a method of determining an order of a plurality of types of correction processes by the noise correction unit according to the first embodiment of the present disclosure.
Figure 12C:
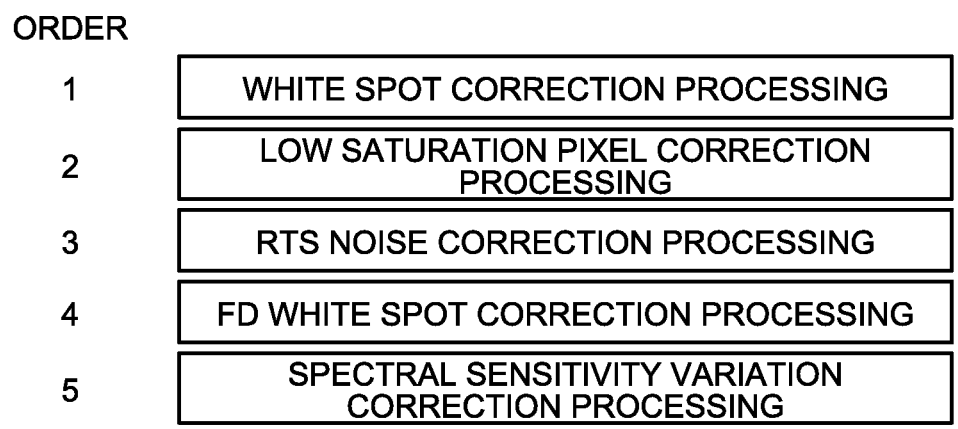
FIG. 12C is a diagram schematically illustrating a method of determining an order of a plurality of types of correction processes by the noise correction unit according to the first embodiment of the present disclosure.

Next, processing executed by the image processing apparatus 20 will be described. FIG. 11 is a flowchart illustrating an outline of noise processing executed by the image processing apparatus 20. FIGS. 12A to 12C are diagrams each schematically illustrating a method of determining an order of a plurality of types of correction processes by the noise correction unit 22. In addition, with FIGS. 11 and 12A to 12C, a description will be given of a case where each of types of correction processes calculates a correction amount or an interpolation value on the basis of neighboring pixels without excluding other noise in neighboring pixels of the pixel of interest.

As illustrated in FIG. 11, first, the noise correction unit 22 obtains noise information from the noise information recording unit 112b via the second external I/F unit 21, the first external I/F unit 115, and the bus 113, and obtains RAW image data from the non-volatile memory 112. Then, the noise correction unit 22 classifies the plurality of types of correction processes into a plurality of groups in accordance with the level of noise on the basis of the obtained noise information (Step S101). Specifically, as illustrated in FIG. 12A, the noise correction unit 22 classifies a group of correction processes such that a group having higher noise level is classified into a group to apply correction process first on the basis of the noise information (refer to Table T1 in FIG. 3) obtained from the noise information recording unit 112b. The reason is that when a correction amount or interpolation value of the target noise is going to be calculated without excluding the other noises in the neighboring pixels, and when noise having a noise level higher than that of the target noise exists in the neighboring pixels, the correction amount or the interpolation value might indicate an inappropriate value due to an increased deviation from an ideal value, leading to improper correction. On the other hand, when noise having a lower noise level than the target noise exists around the target noise, the correction amount or interpolation value might have smaller deviation from the ideal value. Due to this circumstance, as illustrated in FIG. 12A, the noise correction unit 22 classifies a plurality of types of correction processes into three groups (high level, medium level, and low level). Furthermore, the noise correction unit 22 sets the order for executing the correction process in accordance with the noise level, onto the three groups. Specifically, the noise correction unit 22 determines the order in the order of the noise level (Group 1→Group 2→Group 3).

Subsequently, the noise correction unit 22 determines the correction process order in accordance with a reverse order of the noise occurrence order, for the correction process within each of the groups (Step S102). Specifically, as illustrated in FIGS. 12B and 12C, the noise correction unit 22 determines, for correction process within each of the groups, the order of correction process determined in accordance with the reverse order of the order of noise occurrence locations along a signal flow (for example, indicated by the arrow A in FIG. 2) on the basis of the noise information (refer to Table T1 in FIG. 3) obtained from the noise information recording unit 112b. The reason for determining the order in accordance with the reverse order of the occurrence order is that it would be possible to execute proper correction by performing reversed calculation of basic arithmetic operations when noise is added by basic arithmetic operations along the signal flow. Note that when the correction process order is not determined in the processing of Step S101 and Step S102, the noise correction unit 22 may determine the correction process order on the basis of another noise characteristic.

Figure 13:
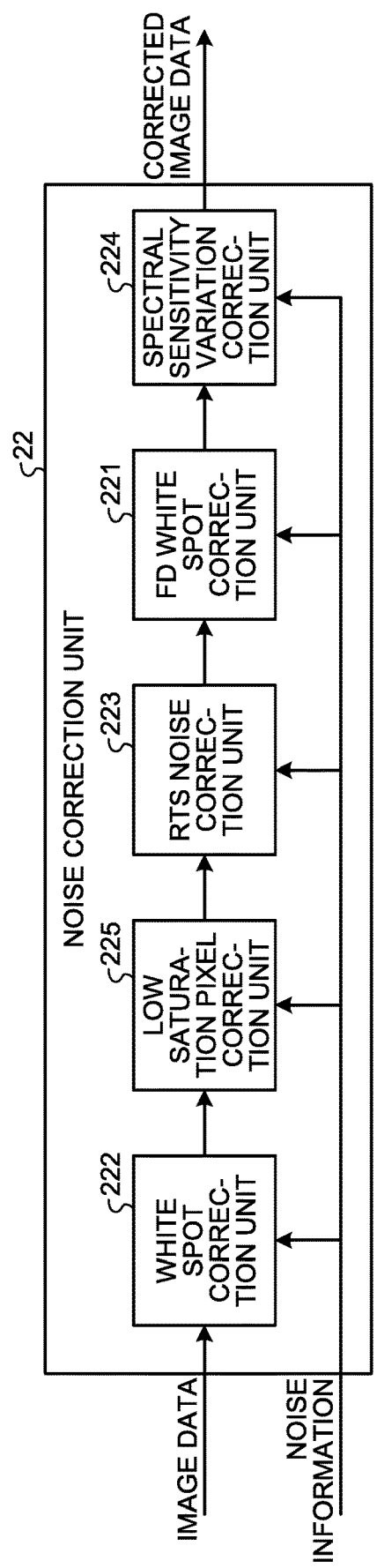
FIG. 13 is a diagram schematically illustrating a configuration of the noise correction unit according to the first embodiment of the present disclosure.

Thereafter, the noise correction unit 22 performs the noise correction processes onto the RAW image data in the correction process order determined in the above-described Step S102 (Step S103). Specifically, as illustrated in FIG. 13, the noise correction unit 22 controls the white spot correction unit 222, the low saturation pixel correction unit 225, the RTS noise correction unit 223, the FD white spot correction unit 221, and the spectral sensitivity variation correction unit 224 in this order, thereby to allow the corresponding noise corrections to be performed in such an order so that the noises in the RAW image data are corrected. With this processing, even when a plurality of types of noise exists, it is possible to perform correction with high accuracy leading to generation of a high-quality image. After Step S103, the image processing apparatus 20 finishes the current processing.

According to the first embodiment of the present disclosure, when a plurality of types of noise occurs in image data, it is possible to prevent degradation in image quality due to an improper correction process order and achieve a high-quality image.

Modification of First Embodiment

Next, a modification of the first embodiment of the present disclosure will be described. A modification of the first embodiment has a similar configuration to the imaging system 1 according to the above-described first embodiment, except that an image processing apparatus executes processing in a different manner from the first embodiment. Specifically, in the modification of the first embodiment, the correction process order is determined by classifying the correction process groups such that a group having a lower noise level is going to be processed first. Hereinafter, processing executed by the image processing apparatus according to a modification of the first embodiment will be described. A same reference sign will be given to the configuration identical to the configuration of the imaging system 1 according to the above-described first embodiment, and description for this will be omitted.

Processing in Image Processing Apparatus

Figure 14:
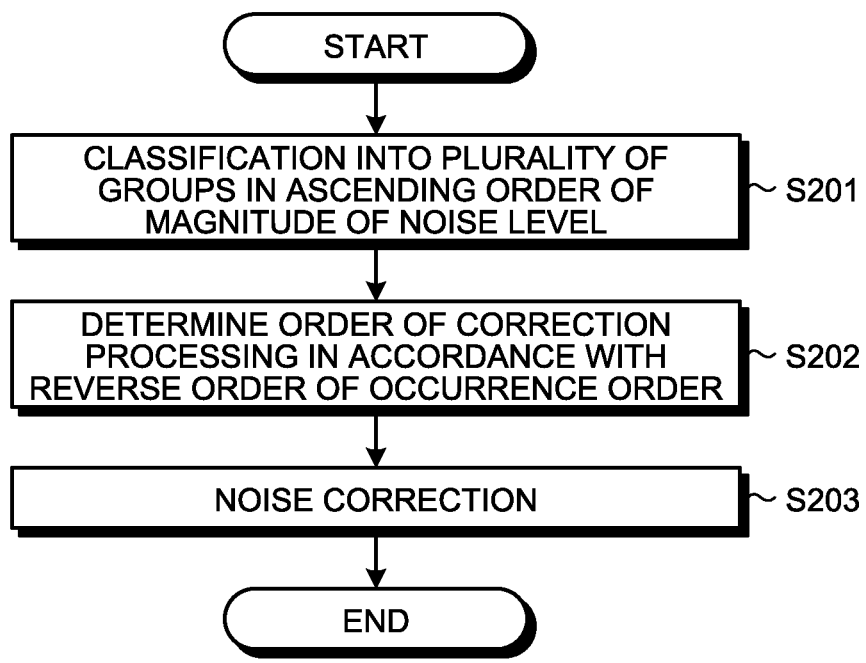
FIG. 14 is a flowchart illustrating an outline of noise processing executed by the image processing apparatus according to a modification of the first embodiment of the present disclosure.
Figure 15A:
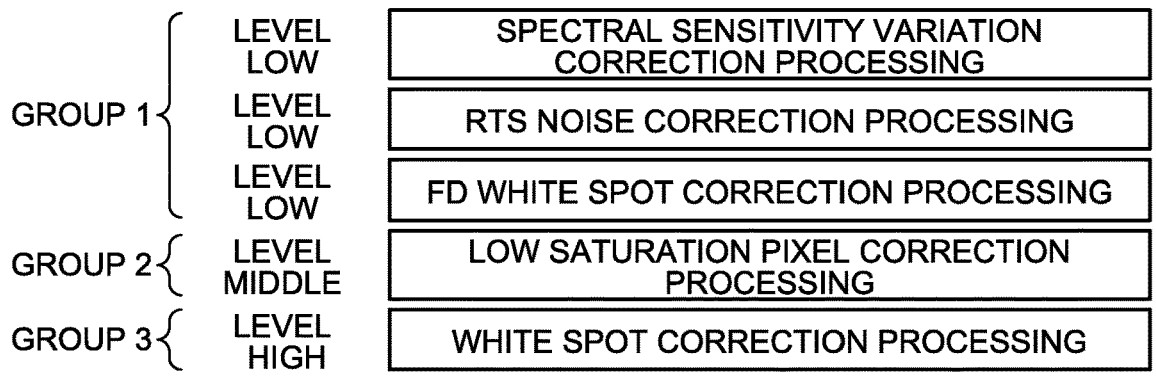
FIG. 15A is a diagram schematically illustrating a method of determining an order of a plurality of types of correction processes by a noise correction unit according to a modification of the first embodiment of the present disclosure.
Figure 15B:
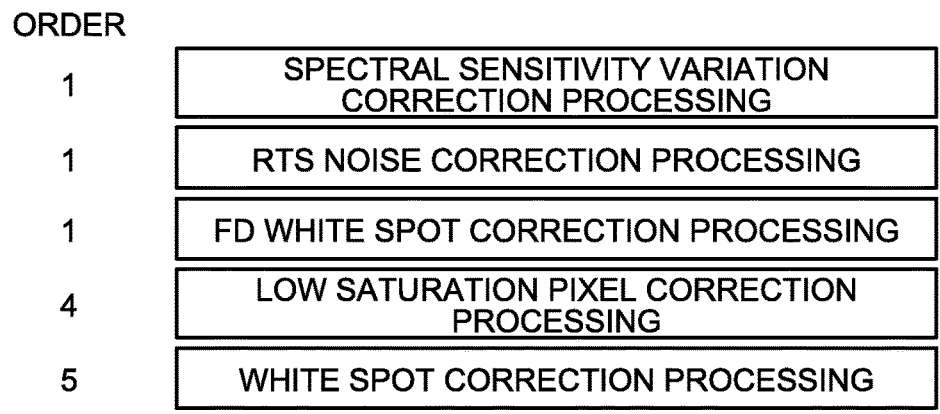
FIG. 15B is a diagram schematically illustrating a method of determining an order of a plurality of types of correction processes by a noise correction unit according to a modification of the first embodiment of the present disclosure.
Figure 15C:
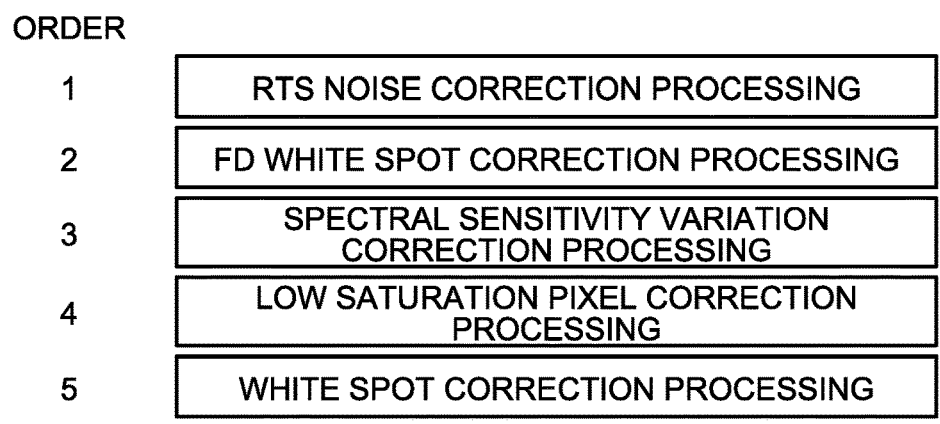
FIG. 15C is a diagram schematically illustrating a method of determining an order of a plurality of types of correction processes by a noise correction unit according to a modification of the first embodiment of the present disclosure.

FIG. 14 is a flowchart illustrating an outline of noise processing executed by the image processing apparatus 20 according to a modification of the first embodiment. FIGS. 15A to 15C are diagrams each schematically illustrating a method of determining an order of a plurality of types of correction processes by the noise correction unit 22. In addition, with FIGS. 14 and 15A to 15C, a description will be given of a case where each of types of correction processes calculates a correction amount or an interpolation value on the basis of neighboring pixels by excluding other noise in neighboring pixels of the pixel of interest.

As illustrated in FIG. 14, first, the noise correction unit 22 obtains the noise information from the noise information recording unit 112b via the second external I/F unit 21, the first external I/F unit 115, and the bus 113, and obtains RAW image data from the non-volatile memory 112. Then, the noise correction unit 22 classifies the plurality of types of correction processes into a plurality of groups in accordance with the level of noise, on the basis of the obtained noise information (Step S201). Specifically, as illustrated in FIG. 15A, the noise correction unit 22 classifies a group of correction processes having low noise level into a group to apply correction process first on the basis of the noise information (refer to Table T1 in FIG. 3) obtained from the noise information recording unit 112b. The reason is that in a case of calculating the correction amount or interpolation value of the target noise by excluding the other noise in the neighboring pixels, noise detection of the other noise would be easier when the level of the other noise is higher, and thus can be appropriately reduced. For this reason, as illustrated in FIG. 15A, the noise correction unit 22 classifies the group of the correction process having the low noise level into the group to apply the correction process first among the plurality of types of correction processes.

Figure 16:
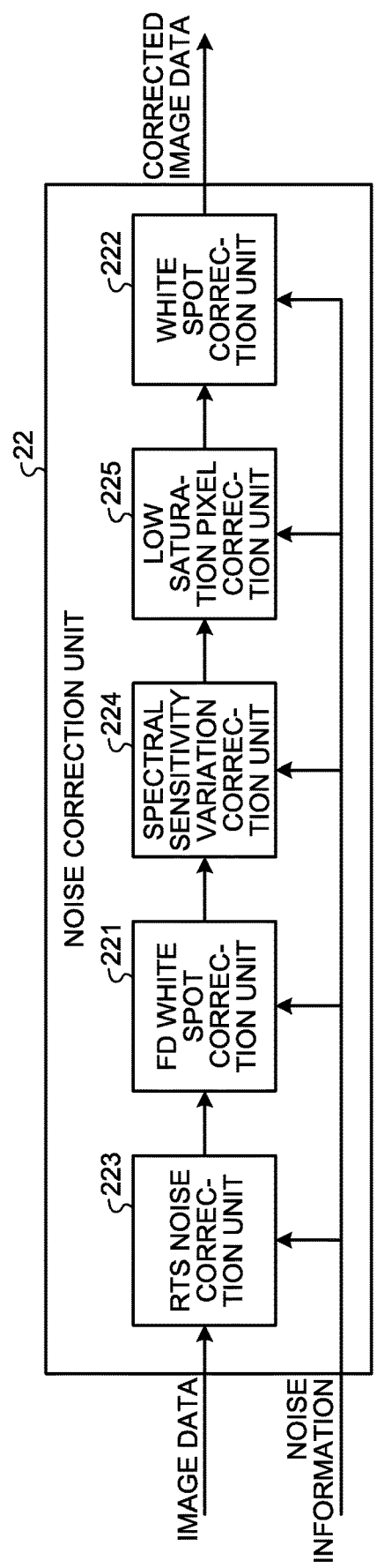
FIG. 16 is a diagram schematically illustrating a configuration of the noise correction unit according to a modification of the first embodiment of the present disclosure.

Steps S202 and S203 correspond to Steps S102 and S103 in above-described FIG. 11, respectively. Specifically, the noise correction unit 22 determines the correction process order determined by the reverse order of the occurrence order of the noise occurrence locations regarding the correction process in each of the groups (FIG. 15B→FIG. 15C). As illustrated in FIG. 16, the noise correction unit 22 controls the RTS noise correction unit 223, the FD white spot correction unit 221, the spectral sensitivity variation correction unit 224, the low saturation pixel correction unit 225, and the white spot correction unit 222 in this order, thereby to allow the corresponding noise corrections to be performed so that the noises in the RAW image data are corrected. After Step S203, the image processing apparatus 20 finishes the current processing.

According to the modification of the first embodiment of the present disclosure, when a plurality of types of noise occurs in image data, it is possible to prevent degradation in image quality due to an improper correction process order and achieve a high-quality image.

Second Embodiment

Next, a second embodiment of the present disclosure will be described. An imaging system according to the second embodiment has a same configuration as the imaging system 1 according to the above-described first embodiment, except that that processing executed by the image processing apparatus is executed in a different manner as in the first embodiment. Hereinafter, processing executed by the image processing apparatus according to the second embodiment will be described. A same reference sign will be given to the configuration identical to the configuration of the imaging system 1 according to the above-described first embodiment, and description for this will be omitted.

Processing in Image Processing Apparatus

Figure 17:
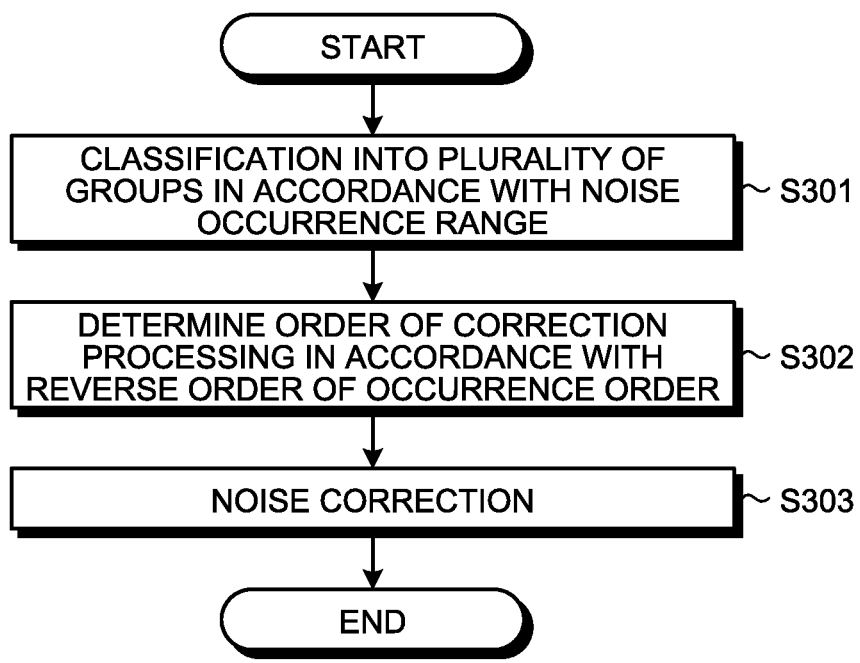
FIG. 17 is a flowchart illustrating an outline of noise processing executed by an image processing apparatus according to a second embodiment of the present disclosure.

FIG. 17 is a flowchart illustrating an outline of noise processing executed by the image processing apparatus according to the second embodiment of the present disclosure. FIGS. 18A to 18C are diagrams each schematically illustrating a method of determining an order of a plurality of types of correction processes by the noise correction unit according to the second embodiment of the present disclosure.

As illustrated in FIG. 17, first, the noise correction unit 22 obtains noise information from the noise information recording unit 112b via the second external I/F unit 21, the first external I/F unit 115, and the bus 113, and obtains RAW image data from the non-volatile memory 112. Then, the noise correction unit 22 classifies the plurality of types of correction processes into a plurality of groups in accordance with a noise occurrence range on the basis of the obtained noise information (Step S301). Specifically, as illustrated in FIG. 18A, the noise correction unit 22 classifies the group such that a group of correction processes having a smaller noise occurrence range is to be classified into a group to apply correction process first on the basis of the noise information (refer to Table T1 in FIG. 3) obtained from the noise information recording unit 112b. The reason for this is that since correction is performed on the basis of neighboring pixels, there is a tendency that the pixel value of the corrected pixel approaches the value obtained by performing LPF processing, as a result of the correction. This might result in expansion of noise in neighboring pixels when noise correction process having a wide noise occurrence range is first executed. For this reason, the noise correction unit 22 determines an execution order such that correction process is going to be executed first onto the correction process group having a smaller noise occurrence range.

Figure 19:
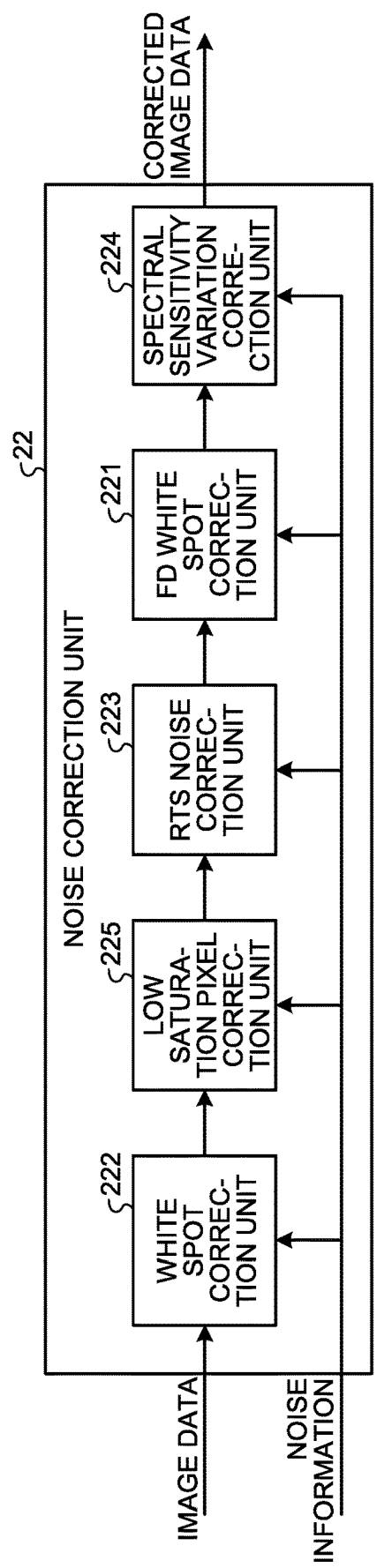
FIG. 19 is a diagram schematically illustrating a configuration of the noise correction unit according to the second embodiment of the present disclosure.

Steps S302 and S303 correspond to Steps S102 and S103 in above-described FIGS. 12A to 12C, respectively. Specifically, the noise correction unit 22 determines the correction process order determined by the reverse order of the occurrence order of the noise occurrence locations regarding the correction process in each of the groups (FIG. 18B→FIG. 18C). As illustrated in FIG. 19, the noise correction unit 22 controls the white spot correction unit 222, the low saturation pixel correction unit 225, the RTS noise correction unit 223, the FD white spot correction unit 221, and the spectral sensitivity variation correction unit 224 in this order, thereby to allow the corresponding noise corrections to be performed so that the noises in the RAW image data are corrected. After Step S303, the image processing apparatus 20 finishes the current processing.

According to the second embodiment of the present disclosure, when a plurality of types of noise occurs in image data, it is possible to prevent degradation in image quality due to an improper correction process order and achieve a high-quality image.

Third Embodiment

Next, a third embodiment of the present disclosure will be described. An imaging system according to the third embodiment has a same configuration as the imaging system 1 according to the above-described first embodiment, except that that processing executed by the image processing apparatus is executed in a different manner as in the first embodiment. Hereinafter, processing executed by the image processing apparatus according to the third embodiment will be described. A same reference sign will be given to the configuration identical to the configuration of the imaging system 1 according to the above-described first embodiment, and description for this will be omitted.

Processing in Image Processing Apparatus

Figure 21A:
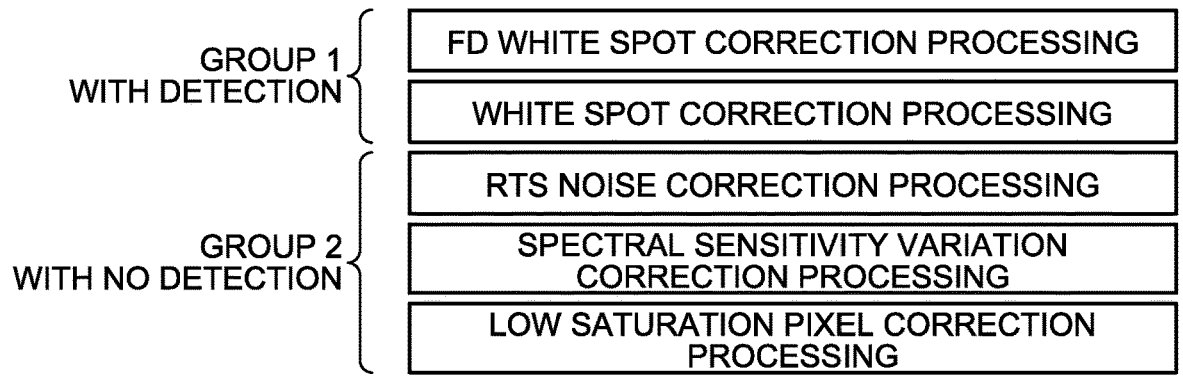
FIG. 21A is a diagram schematically illustrating a method of determining an order of a plurality of types of correction processes by a noise correction unit according to the third embodiment of the present disclosure.
Figure 21B:
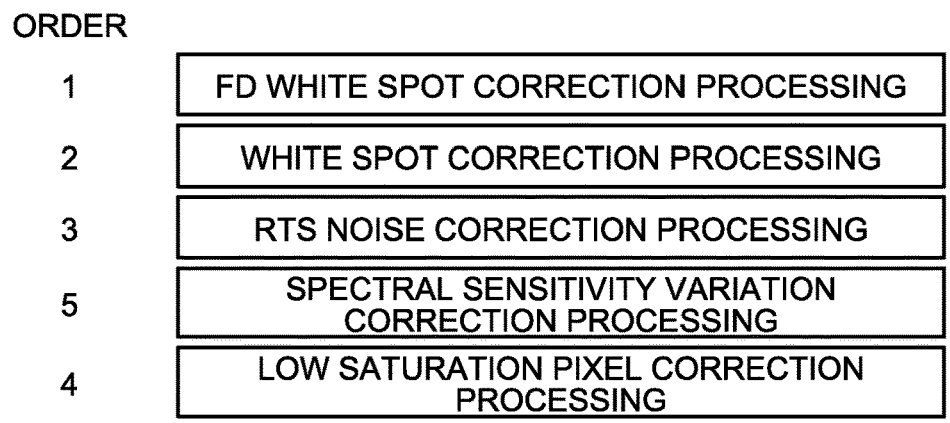
FIG. 21B is a diagram schematically illustrating a method of determining an order of a plurality of types of correction processes by the noise correction unit according to the third embodiment of the present disclosure.
Figure 21C:
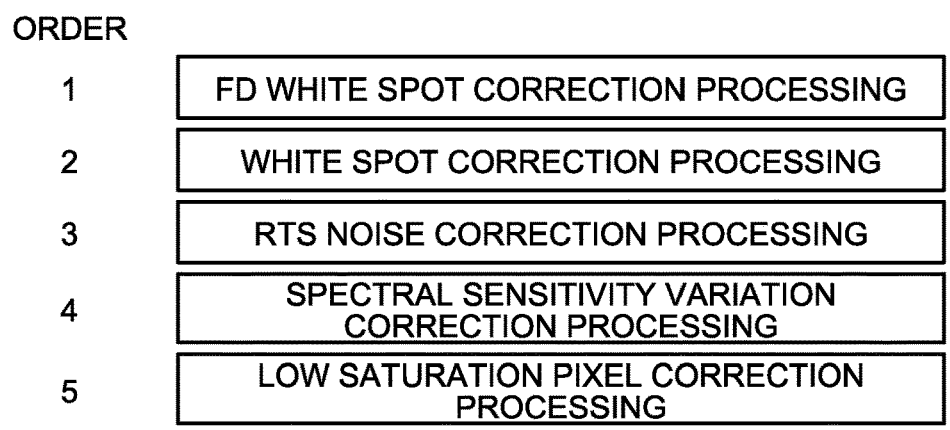
FIG. 21C is a diagram schematically illustrating a method of determining an order of a plurality of types of correction processes by the noise correction unit according to the third embodiment of the present disclosure.

FIG. 20 is a flowchart illustrating an outline of noise processing executed by the image processing apparatus according to the third embodiment of the present disclosure. FIGS. 21A to 21C are diagrams each schematically illustrating a method of determining an order of a plurality of types of correction processes by the noise correction unit according to the third embodiment of the present disclosure.

As illustrated in FIG. 20, first, the noise correction unit 22 obtains noise information from the noise information recording unit 112b via the second external I/F unit 21, the first external I/F unit 115, and the bus 113, and obtains RAW image data from the non-volatile memory 112. Then, the noise correction unit 22 classifies the plurality of types of correction processes into a plurality of groups in accordance with the presence/absence of detection at correction on the basis of the obtained noise information (Step S401). Specifically, as illustrated in FIG. 21A, the noise correction unit 22 classifies the group into a group in which correction is performed with detection and a group in which correction is performed with no detection on the basis of the noise information (refer to Table T1 in FIG. 3) obtained from the noise information recording unit 112b. Furthermore, the noise correction unit 22 classifies the group in which correction is performed with detection into a group to apply correction process first. Regarding the correction without detection, each of the noises has been detected based on an image data acquired by photographing a predetermine reference object under appropriate conditions at a factory before shipment, and data obtained at that time is used as the noise information (positions and noise levels). For this reason, this method would be effective for noises to be corrected because it is unlikely that noise occurs in a new pixel at a late stage. In contrast, regarding the noise to be corrected by the correction method with detection, noise might occur in a new pixel at a late stage. In consideration that this noise needs to be corrected, the method of correcting with detection would be effective. In addition, when target noise is corrected in any of the correction method, the noise correction unit 22 performs correction in consideration of the presence/absence of other noise in neighboring pixels on the basis of position information on other noises obtained at factory shipment. In this case, by performing the correction process with detection first, the noise correction unit 22 can correct a plurality of types of noises without being affected by the noise that has occurred at a late stage.

Step S402 corresponds to the above-described Step S102 of FIGS. 12A to 12C. Specifically, the noise correction unit 22 determines the correction process order in accordance with the reverse order of the occurrence order, for the correction process within each of the groups (FIG. 21B). After Step S402, the image processing apparatus 20 advances the processing to Step S403.

Subsequently, on the basis of the noise information, the noise correction unit 22 determines the order so that correction process in which correction on/off is switched (or correction process which may be performed or skipped) depending on a specific condition is performed in a later stage (Step S403). For example, the noise correction unit 22 determines the order so that the low saturation pixel correction process is to be performed later than the spectral sensitivity variation correction process (FIG. 21B→FIG. 21C). The low saturation pixel correction process is performed in a high luminance scene in which the pixel value is near saturation, whereas this correction is not to be performed in low or medium luminance scenes. In this manner, when the correction on/off is switched depending on a specific condition, such correction process may favorably performed in a later stage than the low saturation pixel correction process in consideration of the correction on/off. In this case, because the correction process in later stages takes the correction on/off into consideration, the processing would become complicated and the processing scale might increase. Therefore, it is preferable to perform the correction process involving correction on/off depending on a specific condition at a later stage.

Figure 22:
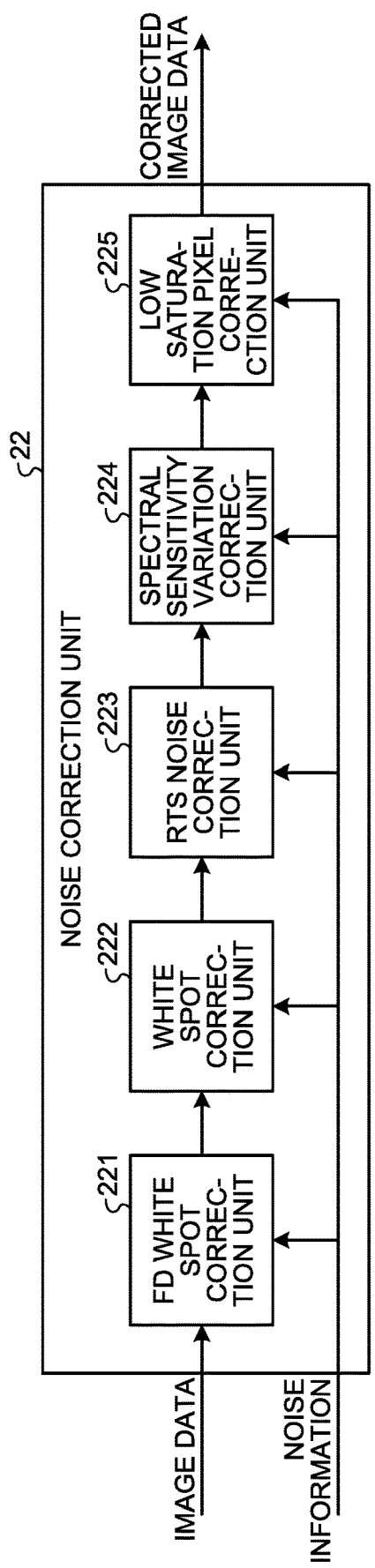
FIG. 22 is a diagram schematically illustrating a configuration of the noise correction unit according to the third embodiment of the present disclosure.

Thereafter, the noise correction unit 22 corrects the noise in the correction process order determined in the above-described Step S403 (Step S404). Specifically, as illustrated in FIG. 22, the noise correction unit 22 controls the FD white spot correction unit 221, the white spot correction unit 222, the RTS noise correction unit 223, the spectral sensitivity variation correction unit 224, and the low saturation pixel correction unit 225 in this order, thereby to allow the corresponding noise corrections to be performed so that the noises in the RAW image data are corrected. With this processing, even when a plurality of types of noise exists, it is possible to perform correction with high accuracy leading to generation of a high-quality image.

According to the third embodiment of the present disclosure, when a plurality of types of noise occurs in image data, it is possible to prevent degradation in image quality due to an improper correction process order and achieve a high-quality image.

Note that in the third embodiment of the present disclosure, when the correction process executed in a preceding stage resulted in occurrence of similar noise being similar to the noise to be corrected by the correction process to be executed in a later stage, the noise correction unit 22 may correct the similar noise together with other noises by the correction process in the later stage. Specifically, when there is a low saturation pixel around a white spot and the white spot correction process is performed, the white spot pixel substantially turns to be the low saturation pixel. In this case, the noise correction unit 22 corrects this in the correction process performed in a later stage.

Other Embodiments

The present disclosure is not limited to the above-described embodiments, but various modifications and further applications are available within the scope of the present disclosure. For example, besides the imaging apparatus used in the description of the present disclosure, the present disclosure can be applied to any apparatus capable of shooting an image of a subject such as a mobile apparatus having an image sensor of a mobile phone or a smartphone or an imaging apparatus that images the subject by using an optical device, such as a video camera, an endoscope, a surveillance camera, or a microscope.

Moreover, in the description of the flowcharts for the operations described above in the present specification, terms such as "first", "next", "subsequently", and "thereafter" are used to describe operation for convenience. These do not denote, however, that the operations need to be performed in this order.

Moreover, the methods of the processing performed by the image processing apparatus in the above-described embodiments, that is, any of the processing illustrated in the flowcharts may be stored as a program that can be executed by a control unit such as a CPU. In addition, it is possible to distribute by storing in a storage medium of the external storage device, such as memory cards (ROM card, RAM card, etc.), a magnetic disk (floppy disk (registered trademark), hard disk, etc.), an optical disc (CD-ROM, DVD, etc.), or a semiconductor memory. The control unit such as a CPU reads the program stored in the storage medium of the external storage device and controls the operation by the read program to execute the above-described processing.

Moreover, note that the present disclosure is not limited to the above-described embodiments and modifications just as they are but can be embodied by modifying the components without departing from the scope of the disclosure at a stage of implementation of the disclosure. Furthermore, a plurality of components disclosed in the above-described embodiments may be appropriately combined to form various embodiments. For example, some components may be omitted from the all the components described in the embodiments and the modifications. Furthermore, the components described in each of exemplary embodiments and modification examples may be appropriately combined with each other.

Moreover, a term which has been described at least once in the specification or the drawings, associated with another term having a broader or similar meaning, may be substituted by this other term anywhere in the specification and the drawings. In this manner, various modifications and further application may be implemented within a scope that does not depart from the present disclosure.

According to the present disclosure, when a plurality of types of noise occurs in image data, it is possible to prevent degradation in image quality due to an improper correction process order and achieve a high-quality image.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus executable of a plurality of types of correction processes of correcting each of a plurality of types of noises having mutually different characteristics included in image data generated by an image sensor including a plurality of pixels that receive light and generate a signal according to an amount of received light and including a plurality of read-out circuits that read out the signal of each of the pixels as a pixel value, the image processing apparatus comprising
   a noise correction unit executable of the plurality of types of correction processes in an order determined in accordance with the characteristic of each of the plurality of types of noises and a signal generating process from a reception of light by the pixels through an output of pixel values from the pixel,
   wherein
   the noise correction unit classifies the plurality of types of correction processes into a plurality of groups, on the basis of the characteristic of each of the plurality of types of noises, and executes the plurality of types of correction processes in an order determined in accordance with the plurality of groups and the signal generating process.

2. The image processing apparatus according to claim 1, wherein the plurality of types of noises are noises that occur in an optical system provided on a light receiving surface of any one of the pixels, any one of the pixels, or any one of the read-out circuits, and
   the noise correction unit executes the plurality of types of correction processes included in each of the plurality of groups in an order determined in a reverse order of an order of noise occurrence in the signal generation process.

3. The image processing apparatus according to claim 1, wherein the noise correction unit executes the plurality of types of correction processes included in each of the plurality of groups in an order determined in accordance with a noise level of each of the noises.

4. The image processing apparatus according to claim 1, wherein the noise correction unit executes the plurality of types of correction processes included in each of the plurality of groups in an order determined in accordance with an occurrence range of each of the noises.

5. The image processing apparatus according to claim 1, wherein the noise correction unit executes the plurality of types of correction processes included in each of the plurality of groups in an order such that a correction process in which correction details are switched depending on a specific condition is to be executed at a later stage than the other correction processes.

6. The image processing apparatus according to claim 1, wherein when a correction process executed in a preceding stage resulted in an occurrence of similar noise being similar to another noise to be corrected by another correction process to be executed in a later stage, the noise correction unit corrects the similar noise together with the another noise by the correction process in the later stage.

7. The image processing apparatus according to claim 1, wherein the plurality of types of correction processes include a correction process of correcting noise while detecting the noise using the image data, and the noise correction unit
   classifies the plurality of types of correction processes into a first group of correction processes that are accompanied with detection of a noise, the detection being performed before correction, and a second group of correction processes that are not accompanied with the detection, and
   executes the plurality of types of correction processes in the order of the first group to the second group.

8. The image processing apparatus according to claim 1, wherein the noise correction unit
   classifies the plurality of types of correction processes into the plurality of groups in accordance with a level of the noises to be corrected by each of the plurality of types of correction processes, and
   executes the plurality of types of correction processes onto the groups in a descending order of magnitude of the level of the noise of the group.

9. The image processing apparatus according to claim 1, wherein the noise correction unit
   classifies the plurality of types of correction processes into the plurality of groups in accordance with an occurrence range of each of the noises to be corrected by each of the plurality of types of correction processes, and
   executes the plurality of types of correction processes in an ascending order of a size of the occurrence range of the group.

10. The image processing apparatus according to claim 1, further comprising a noise information recording unit recordable of noise information related to each of the plurality of types of noises.

11. An image processing method to be executed by an image processing apparatus executable of a plurality of types of correction processes of correcting each of a plurality of types of noises having mutually different characteristics included in image data generated by an image sensor including a plurality of pixels that receive light and generate a signal according to an amount of received light and including a plurality of read-out circuits that read out the signal of each of the pixels as a pixel value, the image processing method comprising
   executing the plurality of types of correction processes in an order determined in accordance with the characteristic of each of the plurality of types of noises and a signal generating process from a reception of light by the pixels through an output of pixel values from the pixel,
   wherein
   the noise correction unit classifies the plurality of types of correction processes into a plurality of groups, on the basis of the characteristic of each of the plurality of types of noises, and executes the plurality of types of correction processes in an order determined in accordance with the plurality of groups and the signal generating process.

12. A non-transitory computer readable medium storing a program that causes an image processing apparatus executable of a plurality of types of correction processes of correcting each of a plurality of types of noises having mutually different characteristics included in image data generated by an image sensor including a plurality of pixels that receive light and generate a signal according to an amount of received light and including a plurality of read-out circuits that read out the signal of each of the pixels as a pixel value, to execute processing, the processing comprising executing the plurality of types of correction processes in an order determined in accordance with the characteristic of each of the plurality of types of noise and a signal generating process from a reception of light by the pixels through an output of pixel values from the pixel, wherein the noise correction unit classifies the plurality of types of correction processes into a plurality of groups, on the basis of the characteristic of each of the plurality of types of noises, and executes the plurality of types of correction processes in an order determined in accordance with the plurality of groups and the signal generating process.

* * * * *